United States Patent
Croxford et al.

(10) Patent No.: US 10,194,156 B2
(45) Date of Patent: Jan. 29, 2019

(54) METHOD OF AND APPARATUS FOR GENERATING AN OUTPUT FRAME

(71) Applicant: ARM LIMITED, Cambridge (GB)

(72) Inventors: Daren Croxford, Cambridge (GB); Sean Ellis, Cambridge (GB); Ben James, Cambridge (GB)

(73) Assignee: ARM Limited, Cambridge (GB)

( * ) Notice: Subject to any disclaimer, the term of this patent is extended or adjusted under 35 U.S.C. 154(b) by 373 days.

(21) Appl. No.: 14/793,907

(22) Filed: Jul. 8, 2015

(65) Prior Publication Data

US 2016/0021384 A1  Jan. 21, 2016

(30) Foreign Application Priority Data

Jul. 15, 2014 (GB) .................................. 1412520.7

(51) Int. Cl.
*H04N 19/503* (2014.01)
*H04N 19/14* (2014.01)
(Continued)

(52) U.S. Cl.
CPC ............... *H04N 19/14* (2014.11); *G06T 1/00* (2013.01); *H04N 19/137* (2014.11);
(Continued)

(58) Field of Classification Search
CPC ........ G06T 1/00; H04N 19/137; H04N 19/14; H04N 19/176; H04N 19/184; H04N 19/85
See application file for complete search history.

(56) References Cited

U.S. PATENT DOCUMENTS

| 5,129,074 A | 7/1992 | Kikuchi et al. |
| 5,181,131 A | 1/1993 | Yamazaki et al. |

(Continued)

FOREIGN PATENT DOCUMENTS

| CN | 1834890 | 9/2006 |
| CN | 101116341 | 1/2008 |

(Continued)

OTHER PUBLICATIONS

Decision on Appeal dated Feb. 2, 2017 in co-pending U.S. Appl. No. 12/588,461, 10 pages.

(Continued)

*Primary Examiner* — Md N Haque
(74) *Attorney, Agent, or Firm* — Nixon & Vanderhye P.C.

(57) ABSTRACT

A method and an apparatus are provided for generating an output frame from an input frame, in which the input frame is processed when generating the output frame. A region of a current input frame is compared with a region of a preceding input frame to determine if the region of the current input frame is similar to the region of the preceding input frame. When the region of the current input frame is determined to be similar to the region of the preceding input frame, information relating to processing performed on the region of the preceding input frame when generating a region of a preceding output frame is read, wherein the information is generated during the processing on the region of the preceding input frame. When the information indicates that the processing is unnecessary, a part or all of the processing of the region of the current input frame can be bypassed or eliminated.

21 Claims, 10 Drawing Sheets

(51) Int. Cl.
*H04N 19/172* (2014.01)
*G06T 1/00* (2006.01)
*H04N 19/176* (2014.01)
*H04N 19/137* (2014.01)
*H04N 19/85* (2014.01)
*H04N 19/184* (2014.01)

(52) U.S. Cl.
CPC ........... *H04N 19/176* (2014.11); *H04N 19/85* (2014.11); *H04N 19/184* (2014.11)

(56) References Cited

U.S. PATENT DOCUMENTS

| | | | |
|---|---|---|---|
| 5,241,656 A | 8/1993 | Loucks et al. | |
| 5,410,546 A | 4/1995 | Boyer et al. | |
| 5,686,934 A | 11/1997 | Nonoshita et al. | |
| 5,793,428 A * | 8/1998 | Coelho | H04N 19/176 375/240.13 |
| 6,003,765 A | 12/1999 | Okamoto | |
| 6,069,611 A | 5/2000 | Flynn et al. | |
| 6,075,523 A | 6/2000 | Simmers | |
| 6,094,203 A | 7/2000 | Desormeaux | |
| 6,101,222 A | 8/2000 | Dorricott | |
| 6,304,606 B1 | 10/2001 | Murashita et al. | |
| 6,825,847 B1 | 11/2004 | Molnar et al. | |
| 7,069,381 B1 | 6/2006 | Kiselev et al. | |
| 7,146,461 B1 | 12/2006 | Kiselev et al. | |
| 7,190,284 B1 | 3/2007 | Dye et al. | |
| 7,471,298 B1 * | 12/2008 | Noonburg | H04N 19/186 345/531 |
| 7,671,873 B1 | 3/2010 | Pierini et al. | |
| 7,836,379 B1 | 11/2010 | Ricci et al. | |
| 8,254,685 B2 | 8/2012 | Greene et al. | |
| 8,671,071 B1 | 3/2014 | Brinson et al. | |
| 8,749,711 B2 | 6/2014 | Um | |
| 8,988,443 B2 | 3/2015 | Croxford et al. | |
| 9,182,934 B2 | 11/2015 | Croxford et al. | |
| 9,195,426 B2 | 11/2015 | Croxford et al. | |
| 9,349,156 B2 | 5/2016 | Croxford et al. | |
| 9,406,155 B2 | 8/2016 | Oterhals et al. | |
| 9,436,722 B1 | 9/2016 | Bent et al. | |
| 9,586,142 B2 | 3/2017 | Danilak | |
| 9,654,510 B1 | 5/2017 | Pillai et al. | |
| 9,767,125 B1 | 9/2017 | Brinson et al. | |
| 2002/0036616 A1 | 3/2002 | Inoue | |
| 2002/0188907 A1 | 12/2002 | Kobayashi | |
| 2003/0080971 A1 | 5/2003 | Hochmuth et al. | |
| 2003/0222797 A1 | 12/2003 | Futa et al. | |
| 2004/0044911 A1 | 3/2004 | Takada et al. | |
| 2004/0141613 A1 | 7/2004 | Hayashi | |
| 2004/0250071 A1 | 12/2004 | Higashiura et al. | |
| 2005/0131939 A1 | 6/2005 | Douglis | |
| 2005/0168471 A1 | 8/2005 | Paquette | |
| 2005/0204263 A1 | 9/2005 | Ricci | |
| 2005/0285867 A1 | 12/2005 | Brunner et al. | |
| 2006/0050976 A1 | 3/2006 | Molloy | |
| 2006/0152515 A1 | 7/2006 | Lee et al. | |
| 2006/0188236 A1 | 8/2006 | Kitagawa | |
| 2006/0203283 A1 | 9/2006 | Fujimoto | |
| 2007/0005890 A1 | 1/2007 | Gabel et al. | |
| 2007/0022420 A1 | 1/2007 | Yamamoto et al. | |
| 2007/0061582 A1 | 3/2007 | Ohmori et al. | |
| 2007/0083815 A1 | 4/2007 | Delorme et al. | |
| 2007/0132771 A1 | 6/2007 | Peer | |
| 2007/0146380 A1 | 6/2007 | Nystad et al. | |
| 2007/0188506 A1 | 8/2007 | Hollevoet et al. | |
| 2007/0257925 A1 | 11/2007 | Brunner et al. | |
| 2007/0261096 A1 | 11/2007 | Lin et al. | |
| 2007/0273787 A1 | 11/2007 | Ogino et al. | |
| 2007/0279574 A1 | 12/2007 | Minamizaki | |
| 2008/0002894 A1 | 1/2008 | Hayon et al. | |
| 2008/0059581 A1 | 3/2008 | Pepperell | |
| 2008/0123747 A1 | 5/2008 | Lee | |
| 2008/0143695 A1 | 6/2008 | Juenemann et al. | |
| 2009/0033670 A1 | 2/2009 | Hochmuth et al. | |
| 2009/0202176 A1 | 8/2009 | Hwang et al. | |
| 2010/0058229 A1 | 3/2010 | Mercer | |
| 2010/0332981 A1 | 12/2010 | Lipton et al. | |
| 2011/0074765 A1 | 3/2011 | Oterhals et al. | |
| 2011/0074800 A1 | 3/2011 | Stevens et al. | |
| 2011/0080419 A1 | 4/2011 | Croxford et al. | |
| 2011/0102446 A1 | 5/2011 | Oterhals et al. | |
| 2012/0092451 A1 | 4/2012 | Nystad et al. | |
| 2012/0159175 A1 | 6/2012 | Yocom-Piatt et al. | |
| 2012/0176386 A1 | 7/2012 | Hutchins | |
| 2012/0206461 A1 | 8/2012 | Wyatt et al. | |
| 2012/0268480 A1 | 10/2012 | Cooksey et al. | |
| 2012/0293545 A1 | 11/2012 | Engh-Halstvedt et al. | |
| 2013/0033728 A1 | 2/2013 | Hinds | |
| 2013/0067344 A1 | 3/2013 | Ungureanu et al. | |
| 2013/0142447 A1 * | 6/2013 | Park | G06T 9/004 382/233 |
| 2014/0152891 A1 | 6/2014 | Gilbert | |
| 2014/0192075 A1 | 7/2014 | Stamoulis et al. | |
| 2014/0219041 A1 | 8/2014 | Kim et al. | |
| 2014/0337301 A1 | 11/2014 | Jang et al. | |
| 2015/0187123 A1 | 7/2015 | Hwang et al. | |
| 2015/0288704 A1 | 10/2015 | Huang et al. | |
| 2016/0021384 A1 | 1/2016 | Croxford et al. | |
| 2017/0192053 A1 | 7/2017 | Jacquet et al. | |

FOREIGN PATENT DOCUMENTS

| | | |
|---|---|---|
| EP | 1 035 536 A2 | 9/2000 |
| EP | 1 484 737 A1 | 12/2004 |
| JP | 63-298485 | 12/1988 |
| JP | 05266177 A | 3/1992 |
| JP | 5-227476 | 9/1993 |
| JP | 11-328441 | 11/1999 |
| JP | 11-355536 | 12/1999 |
| JP | 2004-510270 | 4/2004 |
| JP | 2005-195899 | 7/2005 |
| JP | 2006-268839 | 10/2006 |
| JP | 2007-81760 | 3/2007 |
| JP | 2007-531355 | 11/2007 |
| WO | WO 02/27661 A2 | 4/2002 |
| WO | WO 2005/055582 A2 | 6/2005 |
| WO | WO 2008/026070 | 3/2008 |
| WO | WO 2014/088707 | 6/2014 |

OTHER PUBLICATIONS

Office Action dated Feb. 13, 2017 in co-pending U.S. Appl. No. 12/588,459, 41 pages.
Office Action dated Feb. 7, 2018 in co-pending U.S. Appl. No. 15/214,800, 34 pages.
Office Action dated Dec. 19, 2017 in co-pending U.S. Appl. No. 15/254,280, 20 pages.
Examiner's Answer dated Oct. 26, 2016 in co-pending U.S. Appl. No. 13/435,733 40 pages.
Notice of Allowance dated Dec. 27, 2016 in co-pending U.S. Appl. No. 14/604,872, 11 pages.
U.S. Appl. No. 12/588,459, filed Oct. 15, 2009; Inventor: Oterhals et al.
U.S. Appl. No. 12/588,461, filed Oct. 15, 2009; Inventor: Stevens et al.
U.S. Appl. No. 13/435,733, filed Mar. 30, 2012; Inventor: Cooksey et al.
U.S. Appl. No. 14/604,872, filed Jan. 26, 2015; Inventor: Croxford.
U.S. Appl. No. 15/214,800, filed Jul. 20, 2016, Inventor: Brkic et al.
U.S. Appl. No. 15/254,280, filed Sep. 1, 2016, Inventor: Croxford et al.
Patent Trial and Appeal Board Decision dated Sep. 28, 2016 in co-pending U.S. Appl. No. 12/588,459, 7 pages.
Examiner's Answer dated Apr. 3, 2014 in co-pending U.S. Appl. No. 12/588,459, 10 pages.
Final Office Action dated Jul. 2, 2013 in co-pending U.S. Appl. No. 12/588,459, 24 pages.
Office Action dated Jan. 22, 2013 in co-pending U.S. Appl. No. 12/588,459, 20 pages.

(56) References Cited

OTHER PUBLICATIONS

Final Office Action dated Aug. 29, 2012 in co-pending U.S. Appl. No. 12/588,459, 29 pages.
Office Action dated Feb. 21, 2012 in co-pending U.S. Appl. No. 12/588,459, 29 pages.
Examiner's Answer dated Feb. 18, 2016 in co-pending U.S. Appl. No. 12/588,461, 7 pages.
Final Office Action dated Feb. 24, 2015 in co-pending U.S. Appl. No. 12/588,461, 25 pages.
Office Action dated Jul. 22, 2014 in co-pending U.S. Appl. No. 12/588,461, 24 pages.
Final Office Action dated Dec. 3, 2013 in co-pending U.S. Appl. No. 12/588,461, 18 pages.
Office Action dated Jun. 5, 2013 in co-pending U.S. Appl. No. 12/588,461, 20 pages.
Office Action dated Feb. 17, 2012 in co-pending U.S. Appl. No. 12/588,461, 20 pages.
Final Office Action dated Jan. 4, 2016 in co-pending U.S. Appl. No. 13/435,733 37 pages.
Office Action dated Apr. 2, 2015 in co-pending U.S. Appl. No. 13/435,733, 39 pages.
Final Office Action dated Jun. 17, 2014 in U.S. Appl. No. 13/435,733 25 pages.
Office Action dated Dec. 20, 2013 in U.S. Appl. No. 13/435,733, 28 pages.
Office Action dated Jul. 12, 2016 in co-pending U.S. Appl. No. 14/604,871, 26 pages.
UK Search Report dated Jan. 23, 2015 issued in GB 1412520.7, 3 pages.
UK Combined Search and Examination Report dated Jan. 12, 2016 in GB 1512828.3, 5 pages.
UK Combined Search and Examination Report dated Jul. 27, 2012 in GB1205846.7, 6 pages.
UK Search Report in GB 0916924.4, dated Jan. 15, 2010, 3 pages.
UK Combined Search and Examination Report dated Jan. 26, 2011 in GB 1016162.8, 6 pages.
UK Combined Search and Examination Report dated Jan. 26, 2011 in GB 1016165.1, 6 pages.
Japanese Office Action issued in Japanese Patent Application No. 2010-213509 dated Jun. 23, 2014 (w/ translation)—7 pp.
Chinese First Office Action dated Jun. 11, 2014 in CN 201010294392.9 and English translation, 17 pages.
Chinese First Office Action dated Jul. 31, 2014 in CN 201010294382.5 and English translation, 54 pages.
English Translation of Japanese Official Action dated Apr. 7, 2014 in Japanese Application No. 2010-213508; Japanese Office Action dated Apr. 7, 2014 in Japanese Application No. 2010-213508.
Cambridge in Colour, "Digital Image Interpolation" 2015 (retrieved Jul. 26, 2016), 12 pages.
P. Turcza et al, "Hardware-Efficient Low-Power Image Processing System for Wireless Capsule Endoscopy" *IEEE Journal of Biomedical and health Informatics*, vol. 17, No. 6, Nov. 2013, pp. 1046-1056.
S.J. Carey et al, "Demonstration of a Low Power Image Processing System using a SCAMP3 Vision Chip" IEEE, Aug. 2011, 2 pages.
Pixelplus Co., Ltd., "Ultra Low-Power & Image-Processing Processor" Brief Sheet, Rev. 2.0, Image ARM Processor, Oct. 27, 2008, 14 pages.
Y. Asada, "Low-Power Technology for Image-Processing LSIs" FUJITSU Sc. Tech. J., vol. 49, No. 1, Jan. 2013, pp. 117-123.
G. Haim et al, "Optimization of Image Processing Algorithms: A Case Study" Feb. 9, 2012, 16 pages.
Bergsagel, Jonathan, et al., "Super high resolution displays empowered by the OMAP4470 mobile processor: WUXGA resolution tablets now becoming a reality for the Android ecosystem", Texas Instruments, Dallas, Texas, Jan. 2012, pp. 1-16.
Khan, Moinul H., et al., "Bandwidth-efficient Display Controller for Low Power Devices in Presence of Occulusion", Consumer Electronics, ICCE 2007, Digest of Technical Papers, International Conference on Jan. 10-14, 2007 (2 pages).

Park, Woo-Chan, et al., "Order Independent Transparency for Image Composition Parallel Rendering Machines", P.-C. Yew and J. Xue (Eds.): A CSA 2004, LNCS 3189, Sep. 7-9, 2004, pp. 449-460.
Heade, T., et al., "HDR Image Composition and Tone Mapping on the Cell Processor", MSc Interactive Entertainment Technology, Trinity College Dublin, Graphic Vision and Visualisation GV2 group, Dec. 11, 2009, pp. 59-66.
"Composition Processing Cores (CPC)", http://www.vivantecorp.com/index.php/en/technology/compositon.html, (2 pages) retrieved Aug. 20, 2014.
XDamage Extension, http://www.freedesktop.org/wiki/Software/XDamage/action=print, last edited May 18, 2013, 2 pages.
Creating a polygon shape from a 2d tile array, mhtml.//X:\Documents and Settings\jtothill.DEHNS.002\Local Settings\Temporar . . . , last edited Oct. 5, 2009, 3 pages.
Android-eepc / base, http://gitorious.org/android-eepc/base/source/ . . . , 2007 ©, retrieved Nov. 12, 2013, 9 pages.
"Qt source code", 2013©, retrieved Nov. 12, 2013, 264 pages https://qt.gitorious.org/qt/qt/source/427e398a7b7f3345fb4dcbc275b3ea29f21185lb.src/gui/kernel/qwidget.cpp.
EGL (OpenGL), http://en.wikipedia.org/wiki/EGL_(OpenGL), last edited Sep. 21, 2012, 2 pages.
Shim et al., *A Compressed Frame Buffer to Reduce Display Power Consumption in Mobile Systems*, IEEE, Asia and South Pacific Design Automation Conference (ASP-DAC'04) Jan. 27-30, 2004, pp. 819-824.
Shim, *Low-Power LCD Display Systems*, School of Computer Science and Engineering, Seoul National University, Korea, 2006, 2 pages.
Shim et al., A Backlight Power Management Framework for Battery-Operated Multimedia Systems, Submitted to IEEE Design and Test of Computers, Special Issue on Embedded Systems for Real-Time Multimedia, vol. 21, Issue 5, pp. 388-396, May-Jun. 2004.
Chamoli, Deduplication—A Quick Tutorial, Aug. 8, 2008, http://thetoptenme.wordpress.com/2008/08/08/duplication-a-quick-tutorial/ pp. 1-5.
Hollevoet et al., *A Power Optimized Display Memory Organization for Handheld User Terminals*, IEEE 2004, pp. 1-6.
Akeley et al., Real-Time Graphics Architecture, http://graphics.stanford.edu/courses/cs448a-01-fall, 2001, pp. 1-19.
Gatti et al., Lower Power Control Techniques for TFT LCD Displays, Oct. 8-11, 2002, Grenoble, France, pp. 218-224.
Choi et al., Low-Power Color TFT LCD Display for Hand-Held Embedded Systems, Aug. 12-14, 2002, Monterey, California, pp. 112-117.
Iyer et al., Energy-Adaptive Display System Designs for Future Mobile Environments, HP Laboratories Palto Alto, Apr. 23, 2003, 15 pages.
Carts-Powell, Cholesteric LCDs Show Images After Power is Turned Off; OptoIQ, Sep. 1, 1998, 5 pages.
Zhong et al., Energy Efficiency of Handheld Computer Interfaces Limits, Characterization and Practice, Jun. 6, 2005, pp. 247-260.
Patel et al., Frame Buffer Energy Optimization by Pixel Prediction, Proceedings of the 2005 International Conference on Computer Design, Jun. 2005, 4 pages.
R. Patel et al., Parallel Lossless Data Compression on the GPU, 2012 IEEE, 10 pages, In Proceedings of Innovative Parallel Computing (InPar '12), May 13-14, 2012, San Jose, California.
Smalley, ATI's Radeon X800 Series Can Do Transparency AA Too, Sep. 29, 2005, 2 pages.
Esselbach, Adaptive Anti-Aliasing on ATI Radeon X800 Boards Investigated, Oct. 17, 2005, 4 pages.
Digital Visual Interface DVI, Revision 1.0, Digital Display Working Group, Apr. 2, 1999, pp. 1-76.
Ma, OLED Solution for Mobile Phone Subdisplay, Apr. 2003, 5 pages.
Z. Ma et al., Frame Buffer Compression for Low-Power Video Coding, 2011 $18^{th}$ IEEE International Conference on Image Processing, 4 pages, Date of conference: Sep. 11-14, 2011.

(56) References Cited

OTHER PUBLICATIONS

M. Weinberger et al., The LOCO-I Lossless Image Compression Algorithm: Principles and Standardization into JPEG-LS, pp. 1-34; Published in: Image Processing, IEEE Transactions on . . . (vol. 8, Issue 8), Aug. 2000.

T.L. Bao Yng et al., Low Complexity, Lossless Frame Memory Compression Using Modified Hadamard Transform and Adaptive Golomb-Rice Coding, IADIS International Conference Computer Graphics and Visualization 2008, Jul. 15, 2008, pp. 89-96.

A.J. Penrose, Extending Lossless Image Compression, Technical Report No. 526, Dec. 2001, pp. 1-149.

M. Ferretti et al., A Parallel Pipelined Implementation of LOCO-I for JPEG-LS, 4 pages; Date of conference: Aug. 23-26, 2004.

Jbarnes' braindump :: Intel display controllers; Jan. 26, 2011; http://virtuousgeek.org/blog/index.php/jbarnes/2011/01/26intel_display_cntrollers; 5 pages, Jan. 26, 2011.

Quick Look at the Texas Instruments TI OMAP 4470 CPU, Kindle Fire HD CPU, http://www.arctablet.com/blog/featured/quick-look-texas-instruments-ti-omap-4470-cpu; posted Sep. 6, 2012 in Archos Gen10 CPU TI OMAP TI OMAP 4470; 12 pages: Sep. 6, 2012.

Vesa Digital Packet Video Link Standard, Video Electronics Standards Association, Version 1, Apr. 18, 2004, 86 pages.

http://www.cs.waseda.ac.jp/gcoe/jpn/publication/symposium/img/S1-4XJin.pdf. Applicant has advised that this web address is no longer active and that the document is not available to the Applicant or inventors.

Final Office Action dated May 25, 2018 in co-pending U.S. Appl. No. 15/254,280, 15 pages.

Final Office Action dated Sep. 11, 2018 in co-pending U.S. Appl. No. 15/214,800, 22 pages.

\* cited by examiner

METHOD OF AND APPARATUS FOR GENERATING AN OUTPUT FRAME

This application claims priority to GB Patent Application No. 1412520.7 filed Jul. 15, 2014, the entire content of which is hereby incorporated by reference.

BACKGROUND

The technology described herein relates to a method of and an apparatus for generating an output frame. In particular, the technology described herein relates to a method of and an apparatus for generating from an input frame an output frame to be displayed on a display device or to be written to memory.

When an image is generated, for example to be displayed on a display device, the image generally requires processing before being displayed. The processing may for example include scaling with respect to the dimensions of the display, upscaling of a low resolution image to a higher resolution image or vice versa, applying a sharpening or smoothing algorithm to the image, performing image enhancement or composing the image with other data such as text or another image, generating information (metadata) about the image, etc.

In a conventional display device, such image processing is generally performed at the frame refresh rate of the display, for example at 60 fps. For currently available tablet display devices, e.g. with a resolution of 2048×1536 pixels at 32bppx, to refresh the display at 60 fps requires the processing of 720 MB of data per second.

Image processing is normally performed in a "single pass", in that the processed image is sent directly to the display without being written to memory. It may be performed within the display controller of the display device or by a processing engine that is separate from the display controller. Performing image processing in a single pass is conventionally considered advantageous as the processed images are used immediately instead of being written back to memory, which would have increased the requirement for bandwidth and power.

However, as display resolutions continue to increase and image processing performed in mobile devices become increasingly complex in order to improve image quality, image processing is expected to become more computationally expensive.

BRIEF DESCRIPTION OF THE DRAWINGS

Embodiments will now be described, by way of example only, with reference to the accompanying drawings, in which.

Like reference numerals are used for like features throughout the drawings, where appropriate.

DETAILED DESCRIPTION

Figure 1:
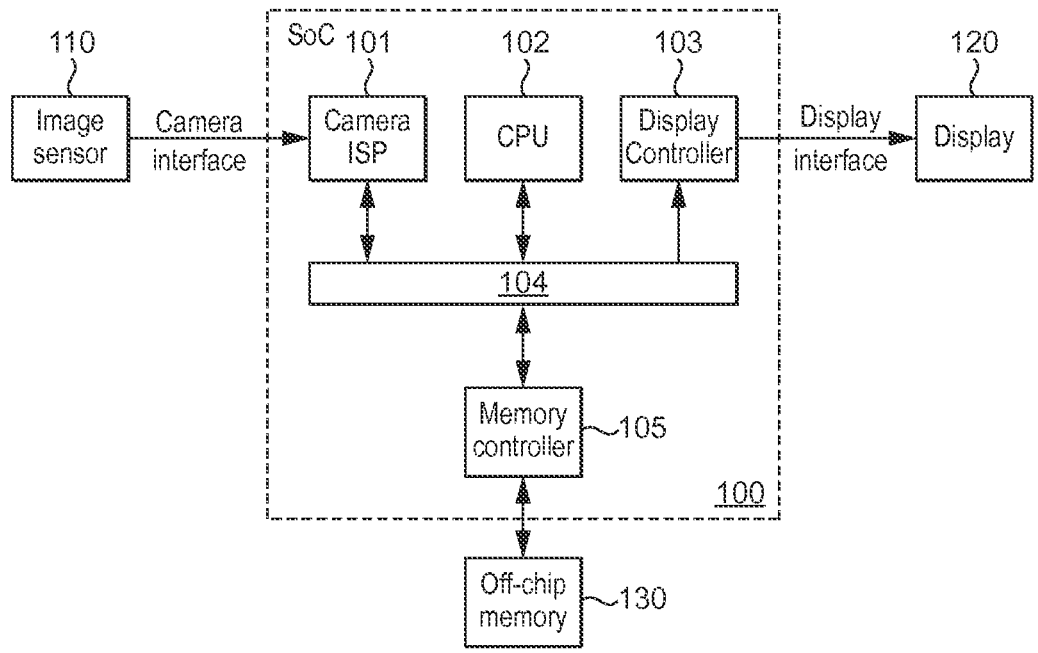
FIG. 1 is a schematic system diagram of a camera ISP system according to an embodiment.

An embodiment comprises a method for generating an output frame from an input frame, in which the input frame is processed when generating the output frame. The method comprises comparing a region of a current input frame with a region of a preceding input frame to determine if the region of the current input frame is similar to the region of the preceding input frame. If the region of the current input frame is determined to be similar to the region of the preceding input frame, information relating to processing performed on the region of the preceding input frame when generating a, e.g. corresponding, region of a preceding output frame is read. If the information indicates that the processing is unnecessary, a part or all of the processing of the region of the current input frame can be omitted (e.g. bypassed or eliminated).

Another embodiment comprises an apparatus for generating an output frame to be displayed from an input frame. The apparatus comprises a processing module configured to process the input frame when generating the output frame, and control circuitry configured to compare a region of a current input frame with a region of a preceding input frame to determine if the region of the current input frame is similar to the region of the preceding input frame. If the region of the current input frame is determined to be similar to the region of the preceding input frame, the control circuitry is configured to read information relating to processing performed on the region of the preceding input frame when generating a, e.g. corresponding, region of a preceding output frame, and to omit a part or all of the processing of the region of the current input frame if the information indicates that the processing is unnecessary.

In the embodiments, an input frame such as a graphics frame, a video frame or a composite frame is received by a display device to be displayed at a predetermined refresh rate, e.g. at 60 fps. The input frame may be processed to obtain an output frame for display, which processing may for example include scaling, image enhancement, and/or composition, etc. As output frames are displayed at the display refresh rate, the processing of input frames must also be performed at the same rate.

It is recognised that a frame, or an area or areas of a frame, may be static (unchanging) for a period of time, for example when a display device is used for displaying pages of an ebook, a web page or a GUI, when the same page or part of a page remains unchanged on the display for a long period of time. In this case, one or more regions of the current input frame that is to be processed for display may be the same as or similar to one or more regions of a preceding input frame that has been processed, and remain substantially unchanging for a period of time.

It is further recognised that, when a region of the current input frame is the same as or similar to a region of a preceding input frame, the result of the processing to be performed on the one region of the current input frame is also likely to be similar or the same.

Thus, for example, if meta-data is generated when processing the preceding input frame, similar meta-data is likely to be produced when processing the region or regions of the current input frame that are the same as or similar to the preceding input frame. Thus, if the meta-data generated when processing the preceding input frame is written to memory, it can be retrieved and used for the current input frame for the region or regions that are similar or the same, such that the metadata generation processing can be bypassed (not performed) for the current input frame region(s) in question.

Correspondingly, if the processing of a region of a preceding input frame to generate the output frame produced no discernible difference to the region of the input frame (this may occur, for example, when a sharpening algorithm is applied to a region containing a single colour, which results in no perceivable change to a user), then that processing of a region or regions of a current input frame that are the same as or similar to the preceding input frame is also likely to produce no discernible effect, such that the processing of the region or regions of the current input frame could be determined to be unnecessary.

The technology described herein facilitates identifying opportunities where it may be possible to avoid some or all of the input frame processing by comparing a region of the current input frame being processed with a corresponding region of a preceding input frame. If the comparison determines that the two frame regions are sufficiently similar, that will indicate that processing the region of the current input frame is likely to have similar or the same effect and result as processing the region of the preceding input frame.

Then, if it is determined that the region of the current input frame is similar to or the same as the region of the preceding input frame, information relating to processing performed on the region of the preceding input frame (which is, e.g., generated when processing is performed on the preceding input frame when generating a preceding output frame), is read, and if the information indicates that any of the processing of the region of the current input frame determined to be the same as or similar to the region of the preceding input frame is unnecessary, then that processing of the region of the current input frame can and may be bypassed or eliminated (not performed).

It is therefore possible to avoid unrequired processing and reduce bandwidth and power usage.

(On the other hand, if the comparison determines that the region of the current input frame is not the same as or not sufficiently similar to the region of the preceding input frame, or the information relating to processing performed on the region of the preceding input frame indicates that the processing is necessary for the current input frame region, then the region of the current input frame should be processed to obtain the corresponding region of the current output frame. The corresponding region of the current output frame obtained by processing the region of the current input frame may then, e.g., be written to memory or directly output to a display as desired.)

The information relating to processing performed on the region of the preceding input frame can comprise any suitable information (metadata) that can be used to determine, and/or that indicates, whether some or all of the processing of a sufficiently similar frame region in a next or the next output frame is necessary or not. It may, e.g., comprise any data that is not the actual frame data itself, such as control data, image data, information, flags and indicators, etc.

Thus, the information (metadata) may be or include the result of analysis of the frame or frame region, such as whether edges are detected, an indication of the type of processing to be performed on the region of the frame such as one or more algorithms to be used, and/or statistics generated to control processing such as e.g. one or more histograms to be used in one or more algorithms applied during processing. Thus, in some embodiments, analysis is performed on a region of the preceding input frame, to generate metadata that comprises information on the type of processing to be performed and/or information for controlling the processing to be performed on the region of the preceding input frame.

The information relating to processing performed on a region of an input frame could, and in an embodiment does, comprise metadata that is otherwise normally generated for the frame or frame regions (and that can be used to determine whether any processing of a subsequent, similar frame region is unnecessary or not). Examples of information of this type would be, for example, metadata indicating whether there are edges in a frame region (such that edge detection analysis for a subsequent, similar frame region can then be determined to not needing to be performed), or other metadata used to control processing, such as histogram information (in this case the histogram metadata for a given input frame region could be stored and then reused for the next frame if the frame regions are similar, thereby allowing the histogram generation to be bypassed in the next frame).

The information relating to the processing of the region of an input frame could also or instead comprise information (metadata) that is specifically intended to indicate whether some or all of the processing of a region of an input frame is unnecessary. An example of this would be information (metadata) indicating that the input to output frame processing had no impact on the input frame region (such that that processing can then be completely avoided (bypassed) if a sufficiently similar input frame region occurs in a subsequent frame).

In this case, the information relating to processing performed on the region of the preceding input frame when generating a region of a preceding output frame will comprise information (metadata) indicating whether the input frame region to output frame region processing had any impact (effect) on the input frame region.

The information relating to processing performed on the region of the preceding input frame may include an indication, for example by writing a bit or setting a flag, of whether the processing performed on the region of the preceding input frame has made a significant or detectable difference in the corresponding region of the preceding output frame, thus effectively indicating whether the processing to be performed on the region of the current input frame is necessary when the region is the same as or at least sufficiently similar to the region of the preceding input frame.

In an embodiment, analysis is performed on the region of the preceding input frame prior to the processing, and the result of the analysis is included in the information relating to processing performed on the region of the preceding input frame to indicate, for example, the type of processing performed on the region of the preceding input frame and/or how the processing was performed. For example, a bit (or bits) may be written or a flag may be set to indicate whether edges have been detected in the region, and/or one or more histograms e.g. for use in image processing algorithms such as adaptive luminance and back light optimization may be written to memory. By writing such metadata for the region of the preceding input frame to memory, it effectively eliminates the need to perform the analysis step on the region of the current input frame if the current input frame region is determined to be the same as or sufficiently similar to the preceding input frame region, thus minimising the total processing required to be performed on the region of the current input frame. In this case, even when the processing performed on the region of the preceding input frame is determined to have made a detectable difference in the corresponding region of the preceding output frame, if the current input frame region is sufficiently similar to the preceding input frame region, part of the processing may still be eliminated and it is therefore possible still to reduce the amount of computation and power consumption required for processing the region of the current input frame.

In an embodiment, the information relating to the processing of the preceding input frame region indicates whether after the region of the preceding input frame was processed, the processing produced no discernible difference to the region of the processed frame (in which case processing of that region can be deemed to be unnecessary). Thus, if the information relating to processing performed on the region of the preceding input frame indicates that the processing performed on the region of the preceding input frame is unnecessary, it is determined that the processing of the region of the current input frame is equally unnecessary and can be avoided (bypassed). In this case, if it is determined that the processing of the region of the current input frame is unnecessary, the region of the current input frame can be, and in some embodiments is, used directly unprocessed as the corresponding region of the current output frame, thus reducing the amount of computation and power consumption compared to if the region of the current input frame is processed.

When the corresponding region of the preceding output frame is determined to be not similar to the region of the preceding input frame, this may be interpreted as the processing performed on the region of the preceding input frame has made a significant or detectable change in the corresponding region of the preceding output frame. Thus, moreover or alternatively, an indicator, for example a bit (bits) or a flag, may be set to indicate that the processing performed on the region of the preceding input frame has made a change or is necessary. The indicator in this case may be the same indicator as in the previous case for indicating that the processing has made no change. For example, the indicator may be set to indicate a change by default, in which case the step of setting an indicator to indicate that the processing is necessary upon detecting a difference or differences between the preceding output frame and the preceding input frame is not required.

The information (metadata) relating to the processing performed on a region of an input frame can be generated as and when desired. It may be generated while processing the region of the input frame to generate the region of the output frame. The generated information should and may be written to memory, from where it may then be read and used as desired when a subsequent input frame is being processed.

The information relating to the processing performed on the regions of an input frame may be generated and stored for the frame as a whole (such that there will be a single set of information that is used for the frame as a whole), or for respective regions or sets of regions of the frame, or both. In an embodiment, a separate set of information relating to the processing performed on the input frame is stored for each respective region that the frames are divided into for processing purposes.

The information relating to the processing of a frame or frame region could always be generated and stored, whenever a frame region is processed (i.e. for each frame and/or frame region). However, it may also or instead only be written periodically, e.g., every certain number of frames, and/or only if certain, selected, conditions or criteria are met.

In an embodiment information relating to the processing of a frame or frame region is only written and stored if it is determined that the information relating to the processing of a frame or frame region is likely to be (re-)used, for example if the region in question is determined to be unchanging or static for a period of time and/or frames, in order to reduce bandwidth and memory usage.

The determination of whether the information relating to the processing of a frame or frame region for a region of a frame is likely to be unchanging or static for a period may be performed in any suitable or desired manner. In some embodiments, information relating to the processing of a frame or frame region is only written to and stored in memory when it is determined that the frame region is the same as or sufficiently similar to a, e.g. corresponding, region of a frame that precedes it. In some embodiments, information relating to the processing of a frame or frame region of a region of a frame is only be written to memory when it is determined that the frame region remains substantially unchanging over a given, e.g. selected, threshold number of cycles (i.e. the frame region is the same as or sufficiently similar to a corresponding region in each of a given, e.g. selected, number of frames that precedes it). The threshold number of cycles may of course be set to any number as desired, and may be dependent on factors such as memory and bandwidth availability.

Whether to write and store the information relating to the processing of a frame or frame region may alternatively or additionally depend of whether the information relating to the processing of a frame or frame region is deemed to be worth storing, for example, based on the size of the amount of data to be written to memory and/or whether it can be compressed effectively.

If the comparison determines that the region of the current input frame is not the same as or similar to the region of the preceding input frame, it may be desirable to indicate that the information relating to the processing of a frame or frame region of the region of the preceding input frame is no longer valid. Thus, in an embodiment, a global valid indicator (e.g. bit or flag) is provided for a frame and/or a per-region valid indicator (e.g. bit or flag) is provided for each region of a frame. The global valid indicator and/or the per-region valid indicators are then set to mark the information relating to the processing of a frame or frame region of a frame region as being invalid if the frame region is determined to be not the same as or similar to a preceding frame region. In the case where information relating to the processing of a frame or frame region is only written periodically, a per-region valid indicator for each frame region may be desirable. Invalid information relating to the processing of a frame or frame region alternatively may simply be deleted (reset to a known (invalid) state) rather than using validity indicators.

As well as the information (metadata) relating to the processing performed on a region of the input frame, other metadata of the input frame or input frame region may be generated. This other metadata of the input frame region may also be written to memory, but need not necessarily be stored, but may simply be generated and used while the input frame is being processed without storing it for future use (e.g. for use with future frames).

It will be appreciated that where the information relating to processing performed on a region of an input frame is only stored (or generated and stored) periodically, then the preceding input frame that is being considered will not necessarily be the immediately preceding input frame, but could be an earlier preceding input frame (and corresponding output frame). Thus, the preceding input frame that is being considered and compared with the current input frame in some embodiments will be the immediately preceding input frame, but in other embodiments it may also or instead be an earlier preceding input frame with there being, e.g., a number of intervening frames between the preceding input frame being considered and the current input frame.

The regions of the frames that are considered in the technology described herein can be any suitable and desired frame regions. Thus the frame regions could comprise the entire frames (i.e. such that each frame will have a single region comprising the entire frame) (and in one embodiment this is what is done). However, in an embodiment, each frame region is a smaller part (area) of the frame, i.e. each frame region represents some but not all of the frame in question.

In this case, the smaller frame regions that the frame is divided into can be any desired and suitable size or shape, but may be rectangular (including square), and may be 8×8, 16×16 or 32×32 sampling positions in size. In an embodiment, each frame region corresponds to one or more "processing" tiles that the frames are divided into for processing purposes, for example to a tile (or tiles) that a graphics processor, video engine, image processor, display controller, composition engine, etc. that is generating or processing the frame in question operates on and produces as its output.

A frame region may correspond to a single processing tile, be made up of a set of plural "processing" tiles, or comprise only a sub portion of a processing tile. For example, in video applications, where video frames are encoded in units of macroblocks, each frame region may be a video frame macroblock that comprises plural tiles that the video and/or graphics processor operates on.

In some embodiments, the plural frame regions of a frame may not all be of equal size.

Other arrangements for dividing a frame into regions are of course possible.

The comparison between two frame regions (e.g. between a frame region of a current input frame and a frame region of a preceding input frame to determine if the frame regions are similar, or between a frame region of an input frame and the corresponding processed output frame region to determine if the processing performed on the input frame region had any (discernible) effect) may be done in any suitable and desired manner. For example, some or all of the content of a frame region in the current input frame may be compared with some or all of the content of a frame region of the preceding input frame.

Like when determining whether the processing performed on a region of an input frame has any effect, a determination that respective frame regions (e.g. that respective input frame regions) are similar may require an exact match between the regions, e.g. between a region of the current input frame and a corresponding region of a preceding input frame, or, e.g. small, differences between the regions may be tolerated, as desired. In an embodiment, the similarity determination is such that the frame regions are determined to be similar if they are sufficiently similar to each other (but they need not exactly match), e.g. if the difference is less than or equal to a given, e.g. selected, similarity threshold. Small differences that are deemed insignificant may be ignored for the similarity determination, thereby increasing the likelihood of a current input frame region satisfying the condition of being sufficiently similar to a preceding input frame region.

In some embodiments, a threshold is set for the similarity determination such that a positive determination does not always require an exact match. The threshold may for example be set such that differences in the LSB (or a selected set of LSBs) only is considered insignificant.

The condition, e.g. threshold, for the frame regions being considered to be similar may be different for different types of processing and/or different displays. The condition, e.g. threshold, for the frame regions being considered to be similar may be variable in use, e.g. may be adjustable by the user of the display, configured to be dynamically adjusted according to external factors such as ambient lighting (e.g. at low level of ambient light the eye is expected to see less detail and so the threshold for a similarity match may be set lower in the current frame), and/or according to non-visual factors such as available/remaining battery level in the case of mobile devices.

In some embodiments, the comparison is performed by comparing information representative of and/or characteristic of the content of the frame regions to assess the similarity or otherwise between the respective regions of the frames.

The information representative of the content of a region of a frame may take any suitable form, but may be based on or derived from the content of the respective frame region. In some embodiments, it is in the form of a signature or multiple signatures for the region which is or are generated from or based on the content of the frame region in question (e.g. the data block representing the region of the frame). Such a region content "signature" may comprise, for example, any suitable set of derived information that can be considered to be representative of the content of the region, such as a checksum, a CRC, or a hash value, etc., derived from (generated for) the data for the frame region in question. Suitable signatures would include standard CRCs, such as CRC64, or other forms of signature such as MD5, SHA 1, etc.

Thus, in some embodiments, a signature or signatures indicative or representative of, and/or that are derived from, the content of each frame region is generated for each frame region that is to be checked, and the comparing process comprises comparing a signature or signatures for a frame region of one frame (e.g. the current input frame) with a signature or signatures for a, e.g. corresponding, frame region of the other frame (e.g. the preceding input frame). The comparison may determine whether the signature/signatures representing the frame region in question has or have changed.

A signature or signatures for a frame region may be generated or fetched in any suitable or desired manner. In some embodiments, a signature or signatures for a frame region may be generated at the same time as the frame region is being generated. The frame region and the signature or signatures are written to memory and the signature or signatures is/are fetched together with the frame region. For example, in applications involving an image processor and/or display controller that performs processing on an input frame to be displayed, a signature (or signatures) is stored with the corresponding frame region and can be fetched with the frame region data when the frame region is fetched for processing. In other embodiments, a signature or signatures for a frame region is/are only generated after a processing engine has received the frame region for processing. For example, in applications involving a camera ISP (image signal processor) that processes images captured by a digital camera or a video engine that processes video frames, a signature (or signatures) may be generated only after the frame region is received by the processor. In this case, once the signature (or signatures) of a region of the current frame has been generated, it can be written to memory and stored. When a new frame is being processed, the stored signature (or signatures) of the current frame may be fetched and compared with signatures generated for the new frame.

Thus, in some embodiments, when a region of a frame, for example the current input frame, is to be compared with a corresponding region of another frame, for example the preceding input frame, a signature or signatures for the respective frame regions are fetched from memory. If no signature is found for the current input frame region (or both frame regions), one or more signatures for the current input frame region (or both frame regions) may be generated based on the content of the current input frame region.

Where signatures representative of the content of the frame regions are used, it may be desirable in some cases to generate a single content-representing signature for each frame region. However, it would also be possible and may sometimes be desirable to sub-divide each frame region that is to be compared into smaller sub-regions for the purposes of the signature generation process. In this case each frame region that is to be compared will have multiple content-indicating signatures associated with it, where one such signature is provided for each sub-region that the frame region has been divided into for the signature generation process. In this case the comparison of the signatures for respective frame regions may comprise comparing the respective signatures for the respective sub-regions of the video frame regions in question in an appropriate manner. Thus, the frame regions may only be determined to be similar to each other if each respective pair of "signature" sub-regions is considered to be similar as a result of the comparison process.

This arrangement may be particularly appropriate where, for example, a processing system operates on sub-regions of frames that do not correspond exactly to how the frame is received. This could be the case, for example in video applications, where the video processing, etc., is carried out in a tile-based fashion, for example using a tile-based video processor and/or graphics processing unit, while video frames are encoded in units of macroblocks. In this example, it could be the case that each video frame macroblock comprises plural tiles that the video and/or graphics processor operates on.

Thus, in an embodiment the frame sub-regions that content-indicating signatures are generated for each corresponds to a tile that a graphics processor, video engine, image processor, display controller, composition engine, etc., that is generating or processing the frame in question operates on and produces as its output. This may be a particularly straightforward way of generating the content-indicating signatures, as the, e.g. graphics processor, will generate the rendering tiles directly, and so there will be no need for any further processing to "produce" the frame sub-regions for which the signatures are generated.

In these arrangements, the tiles that the frames are divided into can be any desired and suitable size or shape, but may be of the form discussed above (thus e.g. rectangular (including square), and e.g. 8×8, 16×16 or 32×32 sampling positions in size).

A frame region considered in the manner of the technology described herein may therefore be made up of a set of plural "processing" tiles, a single processing tile, or comprises only a sub-portion of a processing tile. In the latter case, the signature for the tile may still be used, e.g., for the purposes of comparing the frame region that the tile encompasses. Equally, it is not necessary for there to be an exact correspondence between the tiles that the signatures are generated for and the frame regions that are to be compared. In the case that there is not an exact correspondence, then signatures for all the tiles that the frame region at least in part covers may be compared to determine if the frame region has changed or not.

The signature generation, where used, may be implemented as desired. For example, a signature generator may be implemented in an integral part of the GPU, video engine (e.g. encoder/decoder), image processor, display controller and/or the composition engine of an image/video processing system, or there may for example be a separate "hardware element" dedicated for this function, e.g. in a host device or in a display device. A signature generator may be provided for one or more or each hardware block, or a sin gle signature generator may be shared amongst plural hardware blocks.

The signatures for the frame regions may be appropriately stored and associated with the regions of the frame to which they relate. In some embodiments, they may be stored with the frames in the appropriate buffers, for example the frame buffer. Then, when the signatures are to be compared, the stored signature(s) for a region may be retrieved appropriately. However, in some embodiments, it may be desirable to generate the signatures for the frame regions only when the frame regions are being compared.

As discussed above, in some examples, the comparison process may require an exact match between two signatures (or between each respective pair of signatures, where plural signatures are being compared) for the two frame regions to be considered the same or sufficiently similar, but in other examples, only a sufficiently similar (but not exact) match, for example, where the difference does not exceed a given threshold, may be required for the two regions to be considered sufficiently similar.

Thus, where signatures indicative of the content of the frame regions are compared, depending upon the nature of the signatures involved, a threshold could be used for the signature comparison processes to ensure that any small changes in the frame regions (in the frame region's signature) are ignored (do not trigger a determination that the frame region has changed), if desired. Additionally, or alternatively, the signature generation process could be configured so as to generate signatures that effectively ignore (are not changed by) only small changes in the frame regions (for example by basing the signatures on some but not all of (e.g. a selection of the most significant bits of) the data values for the frame regions in question.

Similarly, in an embodiment, the signature comparison process, e.g. threshold, may be adjustable and adjusted in dependence on current conditions of the system that is displaying the frames, such as visual criteria such as the ambient light level, and/or non-visual criteria, such as current available/remaining battery capacity.

The technology described herein can be used for any suitable and desired form of processing that is performed when generating an output frame from an input frame. For example, the processing may include scaling with respect to the dimensions of a display, upscaling of a low resolution image to a higher resolution image or vice versa, applying a sharpening or smoothing algorithm to an image, performing image enhancement or composing the image with other data such as text or another image, etc.

For example, when scaling and/or image processing algorithms are applied to one or more regions of an input frame, corresponding, e.g. image, analysis may first be performed on a region to be processed to determine the type of processing to be performed on the region and/or to generate data that controls the processing of the region. For example, for adaptive image scaling, image enhancement and/or machine vision algorithms, edge detection may first be performed to detect any edges within the region to be processed in order, e.g. to determine whether a smoothing algorithm is to be used in the case where no edges are detected, or if a sharpening algorithm is to be used in the case where edges are detected. As another example, for adaptive luminance and back light optimization or other image processing operations, (image) analysis may first generate one or more histograms for the region to be processed to control or be used in the image processing operation, e.g. to determine the luminance and/or back light level of the region.

The technology described herein can be used for all of these processes.

The Applicants have further recognised that some forms of input frame processing and output frame generation, such as when display processing is being performed, can comprise plural processing stages (i.e. plural processing stages in which each processing stage takes an input frame or frames and generates a respective output frame for that processing stage). In this case, there may be a sequence of plural processing stages between the initial input frame and the final output frame that is provided for use (e.g. for display). This may be because, e.g., the processing of an input frame (or a region thereof) may involve more than one type of processing over multiple stages involving multiple algorithms, or an algorithm applied when processing the input frame may have multiple steps. For example, edge analysis may be performed on a frame region to detect any edges present in the region, the frame region may then be (up or down) scaled with respect to the dimension of the display and may furthermore undergo contrast enhancement, etc.

The Applicants have further recognised that the arrangements of the technology described herein could usefully be applied to each such processing stage, e.g. if it is desirable and appropriate to do that. In this case therefore, the information relating to processing performed on the region of the preceding input frame may be generated and stored for one or more stages of the overall processing performed on the region of the preceding input frame. For example, an indicator may be provided for each stage of the processing, for example by writing a bit or setting a flag for each stage, to indicate whether that stage of the processing has made a detectable or significant difference in the corresponding region of the preceding output frame that is discernible by a user, thus effectively indicating whether that stage of the processing is necessary. Similarly, if analysis has been performed for one or more stages of the processing of the region of the preceding input frame, the result of the analysis may be stored (and then (if possible) reused) for respective processing stages. This may allow a stage or stages of the processing to be avoided (bypassed) if the information indicates that the stage or stages of the processing is or are not necessary.

Thus, in an embodiment, the operation in the manner of the technology described herein is applied to an intermediate processing stage of a sequence of frame processing stages. In this case, the output frame will accordingly be the output frame of the processing stage in question (rather than, e.g., being the final output frame that is to be provided to the display), and the input frame will be the respective input frame for the processing stage in question (and thus again need not be the initial, "original" input frame).

In this case therefore there may be plural processing stages that operate to generate the final output frame, and one or more of those processing stages (and in an embodiment plural of those processing stages) will operate in the manner of the technology described herein.

It would be possible to use the method of the technology described herein at one or at more than one of the multiple processing stages. This may depend, for example, on whether it could be advantageous to use the method of the technology described herein for the processing stage in question.

Although the technology described herein has been described above with particular reference to the processing of a given input frame to generate a given output frame, as will be appreciated by those skilled in the art, the technology described herein may be used and applied to a sequence of frames that are being processed, e.g. when a sequence of output frames is being generated for display. In this case, each frame (or selected frames) of the sequence may be processed in the manner of the technology described herein.

It will also be appreciated that for each frame in the sequence of frames there will be a set or sequence of processing that each frame is intended to be subjected to (to undergo) to generate the desired output frame. The technology described herein will then be used to bypass or eliminate some or all of the sequence of processing where the opportunity to do that is identified in the manner of the technology described herein.

It will be appreciated from the above that the technology described herein accordingly relates in particular to arrangements in which frames are intended to be subjected to a sequence or set of processing, with the technology described herein then being used to avoid or bypass some or all of that processing for frames where it can be identified that that is possible. Thus, the processing that the current input frame is to be subjected to may be the same as the processing that the preceding input frame being considered was subjected to, and then the comparison between the current and preceding input frame regions and the information relating to the processing of the preceding input frame will be used to identify whether any of that processing can be omitted (and thus bypassed or eliminated (not performed)) for the current frame.

The technology described herein may be implemented in any desired and suitable data processing system that is operable to generate frames to be transmitted to an electronic display for display.

The data processing system that the technology described herein is implemented in may contain any desired, appropriate and suitable elements and components. Thus it may contain one or more of or all of: a CPU, a GPU, a video processor (video engine/encoder-decoder), an image processor, a display controller, a camera ISP, and appropriate memory for storing the various frames and other data that is required.

The comparison between a frame region of a current input frame with a frame region of a preceding (or the same) input frame may be performed by any suitable and desired component of the overall data processing system. For example, this could be performed by a CPU, GPU or separate processor (e.g. ASIC) provided in the system (in the system on-chip) or by the display controller for the display in question. The same element could perform all the processes, or the processes could be distributed across different elements of the system, as desired.

The current input frame, current output frame, preceding input frame, preceding intermediate frame, preceding output frame, any other graphics frame, composited frame, and source, input or output frames, etc. may be stored in any suitable and desired manner in memory, e.g. in appropriate buffers. For example, the output frame may be stored in an output frame buffer. The output frame buffer may be an on chip buffer or it may be an external buffer. Similarly, the output frame buffer may be dedicated memory for this purpose or it may be part of a memory that is used for other data as well.

Similarly, the buffers that the input frames are first written to when they are generated (rendered) may comprise any suitable such buffers and may be configured in any suitable and desired manner in memory. For example, they may be an on chip buffer or buffers, or may be an external buffer or buffers. Similarly, they may be dedicated memory for this purpose or may be part of a memory that is used for other data as well. The input frame buffers may, for example, be in any format that an application requires, and may, for example, be stored in system memory (e.g. in a unified memory architecture), or in graphics memory (e.g. in a non-unified memory architecture).

As will be appreciated by those skilled in the art, embodiments of the technology described herein can include any one or more or all of the optional features of the technology described herein, as appropriate.

The technology described herein may be implemented in any suitable system, such as a suitably configured microprocessor based system. In some embodiments, the technology described herein is implemented in a computer and/or micro-processor based system.

The various functions of the technology described herein may be carried out in any desired and suitable manner. For example, the functions of the technology described herein may be implemented in hardware or software, as desired. Thus, for example, the various functional elements of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

The technology described herein is applicable to any suitable form or configuration of graphics/video processor and renderer, such as processors having a "pipelined" rendering arrangement (in which case the renderer will be in the form of a rendering pipeline). It is particularly applicable to tile-based graphics processors, graphics processing systems, video processors, video processing systems, composition engines and compositing display controllers.

It will also be appreciated by those skilled in the art that all of the described embodiments of the technology described herein may include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on data processor, a computer program element comprising computer software code portions for performing the methods herein described when the program element is run on data processor, and a computer program comprising a code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

A first exemplary data processing system 100 for use in a digital camera is shown in FIG. 1, which is configured to implement a method for generating output frames for display according to an embodiment.

The data processing system 100 comprises a camera image signal processor (ISP) 101, a CPU 102 and a display controller 103 that communicate via an interconnect 104. The camera ISP 101, CPU 102 and display controller 103 access an off-chip memory 130 via a memory controller 105. Upon receiving an image, e.g. a photograph, from an image sensor 110 of the camera via a camera interface, the camera ISP 101 processes the received image under the control of CPU 102, and the processed image is output to a display 120 by the display controller 103.

According to the present embodiment, as the camera ISP 101 is processing a region of the received image, a comparison is performed between the current image (frame) region and a region of a preceding (previously received) image to determine if the current region is the same as or similar to the region of the preceding image. The comparison between the current image and the preceding image may be performed between two corresponding regions or it may be performed between two arbitrary regions, although it is assumed that a comparison between two corresponding regions is more likely to result in a match. In the present example, data relating to the region of the preceding image, for example one or more signatures derived from, representative or indicative of the content of the region, may be stored in the off-chip memory 130 and fetched by the memory controller 105 or it may be stored in an appropriate buffer on chip. The comparison and determination may be performed by the camera ISP 101, the CPU 102 or a separate hardware element located between or in the interconnect 104 (not shown).

If the current region is determined to be the same as or similar to the region of the preceding image, meta-data comprising information relating to the processing of the region of the preceding image, for example fetched from the off-chip memory 130, is read and the processing of the current region is performed based on the read information. The meta-data may for example be written to memory when or after the region of the preceding image was processed. For example, the information of the region of the preceding image may indicate that processing performed on that region has made no change in the processed region, in which case the processing performed on the region of the preceding image is deemed unnecessary, and thus, based on the read information, part or all of the processing to be performed on the current region may be omitted, e.g. eliminated or bypassed.

Figure 2:
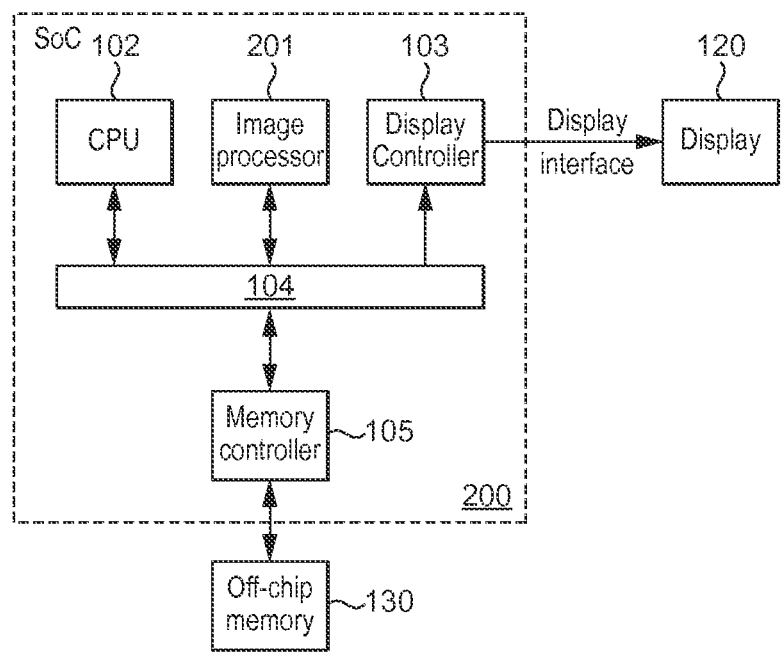
FIG. 2 is a schematic system diagram of an image processing system according to an embodiment.

A second exemplary data processing system 200 is shown in FIG. 2, which is configured to implement a method for generating output frames for display according to an embodiment.

The data processing system 200 again comprises a CPU 102, a display controller 103 and a memory controller 105, but an image processor 201 replaces the camera ISP 101. Upon receiving a graphics frame, the image processor 201 processes the received frame under the control of CPU 102, and the processed frame is output to the display 120 by the display controller 103.

Similar to the data processing system 100, when a frame region of the current frame is to be processed, a comparison is performed between that frame region and a frame region of a preceding frame to determine if the current frame region is the same as or similar to the region of the preceding frame. Again, the comparison between the current image and the preceding image may be performed between two corresponding regions or it may be performed between two arbitrary regions, although it is assumed that a comparison between two corresponding regions is more likely to result in a match. Data relating to the region of the preceding image, for example one or more signatures derived from, representative or indicative of the content of the region, may be stored in the off-chip memory 130 and fetched by the memory controller 105 or it may be stored in an appropriate buffer on chip. The comparison and determination may be performed by the image processor 201, the CPU 102 or a separate hardware element located between or in the interconnect 104 (not shown).

If the current frame region is determined to be the same as or similar to the region of the preceding frame, (meta-data comprising) information relating to the processing of the region of the preceding frame, fetched for example from the off-chip memory 130, is read and the processing of the current frame region is performed on the basis of the read information. For example, if the information indicates that processing performed on the region of the preceding frame has made no change in the processed region, part or all of the processing to be performed on the current region may be eliminated or bypassed based on the read information.

Figure 3:
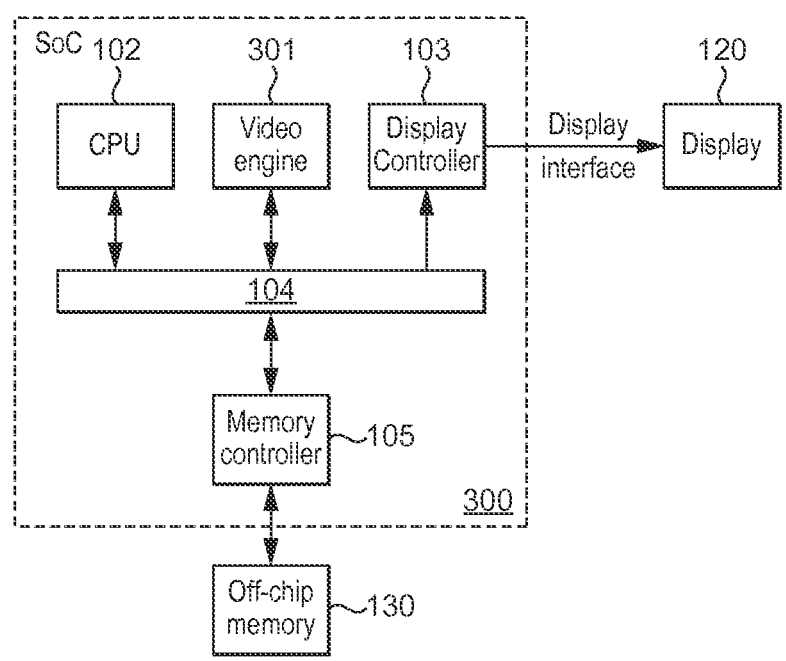
FIG. 3 is a schematic system diagram of a video processing system according to an embodiment.

A third exemplary data processing system 300 is shown in FIG. 3, which is configured to implement a method for generating output frames for display according to an embodiment.

Compared to the data processing systems 100 and 200, the data processing system 300 comprises a video engine 301 instead of the camera ISP 101 and the image processor 201. Upon receiving a video frame, the video engine 301 processes the received frame under the control of CPU 102, and the processed frame is output to the display 120 by the display controller 103. The data processing system 300 similarly performs comparisons and determinations for frame regions of the current video frame, and the video engine 301 processes the frame regions on the basis of the information relating to the processing of the preceding frame when it is determined that a frame region of the current frame is similar to or the same as a frame region of the preceding frame. For example, if the information indicates that processing performed on the region of the preceding frame has made no change in the processed region, part or all of the processing to be performed on the current region may be eliminated or bypassed based on the read information.

Alternatively or additionally, a video frame is output by the video engine 301 to the display controller 103 for processing before outputting it to the display 120. The data processing system 300 performs comparisons and determinations for frame regions of the current video frame, and the display controller 103 processes the frame regions on the basis of the information relating to the processing of the preceding frame when it is determined that a frame region of the current frame is similar to or the same as a frame region of the preceding frame.

Again, the comparison and determination may be performed by the video engine 301, the CPU 102 or a separate hardware element located between or in the interconnect 104 (not shown).

Figure 4:
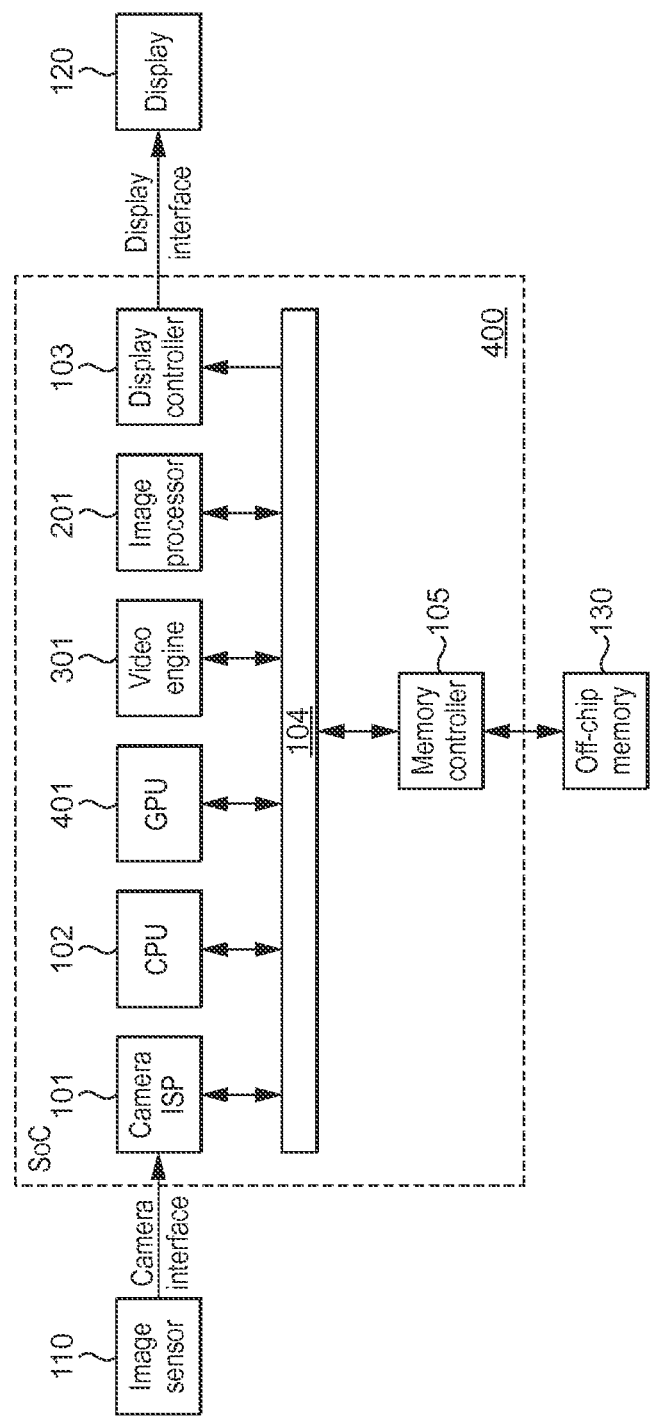
FIG. 4 is a schematic system diagram of a combined camera ISP-image-video processing system.

A fourth exemplary data processing system 400 is shown in FIG. 4. The present example is a combination of all the components of the data processing systems 100, 200 and 300, and further comprises a GPU 401.

The comparison between the current frame and the preceding frame may be performed on a region by region basis. The frame regions may be divided in any suitable way as desired, such that a frame may be divided into any number of frame regions, and in some embodiments, a complete frame may be considered as one single frame region. Each region may be of equal size or different sizes, although equal-sized regions are desired for ease of comparison. In some embodiments, a frame region corresponds to a processing tile.

In the present embodiments, the determination of whether a frame region of a current input frame is similar to a frame region of a preceding input frame (i.e. whether the current frame region is likely to undergo the same processing) is performed by comparing signatures representative of the content of the respective frame regions. In the embodiments, a signature is generated for each processing tile of the current input frame that is representative of the content of that tile, and a signature is generated for each processing tile of a preceding input frame that is representative of the content of that tile. The signatures of the tiles that correspond to the region of the current input frame being considered are then compared with the signatures of the tiles that correspond to the region of the preceding input frame.

In the present embodiments, a frame region that is being considered corresponds to a tile. However, it may be the case that each frame region encompasses an area that comprises plural processing tiles. In this case, a frame region is likely to have more than one content indicating signature associated with it. In this case, when frame regions are being compared, the relevant content indicating signatures for each tile associated with the frame region in question may be respectively compared with each other, and only if each respective pair of tile signatures are the same, is it determined that the frame regions are similar (i.e. that the current frame region will undergo the same processing). Alternatively, multiple signatures corresponding to the multiple tiles of a frame region may be combined to generate a single signature for the frame region, or a single signature may be generated for a frame region that encompasses multiple tiles.

To facilitate this operation, one or more content indicating signatures are generated for each frame tile, and those content indicating signatures, as well as any other data representing the frame regions themselves, such as information relating to the processing performed on the frame region, are stored for use at a later stage. This data may be stored, for example, in the off chip memory 130. Other arrangements would, of course, be possible, if desired.

In an example, the process of generating the frame tile content indicating signatures may be performed by a signature generation hardware unit provided for or in the data processing system. The signature generation unit may be provided as an integral part of the CPU 102, the GPU 401, the camera ISP 101, the image processor 201, the video engine 301 or the display controller 103, as a separate hardware unit on- or off-chip, or in any other suitable form, and operates to generate for each frame tile a signature representative of the content of the frame tile. Multiple signature generation units may of course be provided for the data processing system if desired, for example a signature generation unit may be provided for each of the GPU 401, the video engine 301 and the display controller 103.

In the example, frame tile data is received by the signature generation unit, for example from the camera ISP 101, image processor 201, video engine 301, GPU 401 or other processor that is generating graphics or video frames, and the data is passed to a buffer, which temporarily stores the frame tile data while the signature generation process takes place, and to a signature generator. The signature generator operates to generate the necessary signature for the frame tile. In an example, the signature may be in the form of a 64 bit CRC for the frame tile. Other signature generation functions and other forms of signature such as hash functions, etc., could also or instead be used, if desired.

A write controller may be associated with the signature generation unit, which, once the signature for a frame region has been generated, operates to store the signature in a per frame tile signature buffer that is associated with the frame in the off-chip memory 130, under the control of the write controller. The corresponding frame tile data is also stored in an appropriate buffer in the off-chip memory 130.

In an embodiment, the content indicating signatures for the frame tiles are generated using only a selected set of the most significant bits of the colours (MSB) in each frame tile (e.g. RGB[7:2]). These MSB signatures are then used to determine whether one frame tile is the same as or similar to another frame tile. The effect of basing the content indicating signatures that are used to determine whether there is a difference between two frame tiles on the MSB of the frame tile data (colour) values only is that the two frame tiles may still be considered sufficiently similar even when there are minor differences between the frame tiles (e.g. differences in the least significant bits (LSB) only), such that frame regions of the current input frame to be processed can make use of the meta-data of the preceding input frame unless there is a significant difference between the frame regions. This has the advantage of reducing the amount of processing required to be performed on a frame to output it for display.

Meta-data of a region of an input frame (comprising information relating to processing performed on the region of the input frame) is obtained when that region is being processed. In some embodiments, the input frame region is compared with a region of an output frame that corresponds to the processed input frame region, e.g. to determine if the output frame region is similar to the input frame region. If it is determined that the two regions are similar, this is taken as an indication that the processing performed on the input frame region has made no change and therefore deemed unnecessary. "No change" may include no change at all, minor changes that affect e.g. only the LSB, or changes that are not discernible or detectable by a user. This may be subjective to individual user and may vary depending on the use environment such as ambient lighting. It may therefore be to allow the threshold of "no change" to be user-specified and/or adaptively or dynamically adjustable. The result of "no change" may be stored in respect of the input frame region, for example by writing a bit or setting a flag, such that if a frame region (e.g. corresponding) of the next input frame is determined to be similar to the input frame region just processed, the meta-data comprising information relating to processing performed on the region of the input frame can be read and the processing of the frame region of the next input frame can be bypassed based on the result of "no change".

The embodiments may be extended to multi-staged (e.g. including one or more of sharpening, scaling and adaptive luminance optimization, etc.) processing. In this case, meta-data may be generated for an input frame region to include information of each stage of the multi-staged processing. For example, an indicator, such as a bit or a flag, may be set for one or more or each stage of the processing to indicate whether that stage of the processing has made any changes. If a processing stage has made no change to the input frame region, the result of "no change" may be stored in respect of that stage which can be selectively bypassed when the next input frame is to be processed (provided that the two input frame regions are determined to be similar).

Other arrangements for reducing the amount of processing required to be performed on a frame could be used, if desired. For example, the comparison process between regions of the current and preceding input frames and/or between regions of the preceding input and output frames may allow matches that are equal to or less than a predetermined threshold to still be considered to indicate that one frame region is sufficiently similar to another frame region, even if there have been some differences within the frame region. Alternative or additionally, information on how the processing is to be performed (intermediate data), for example the algorithm to use or histograms for use in adaptive optimization, may be included in the (meta-data comprising) information relating to processing performed on the region of the preceding input frame and stored for later use even if comparison between frame regions of the preceding input and output frames has determined that the processing is necessary.

Figure 5:
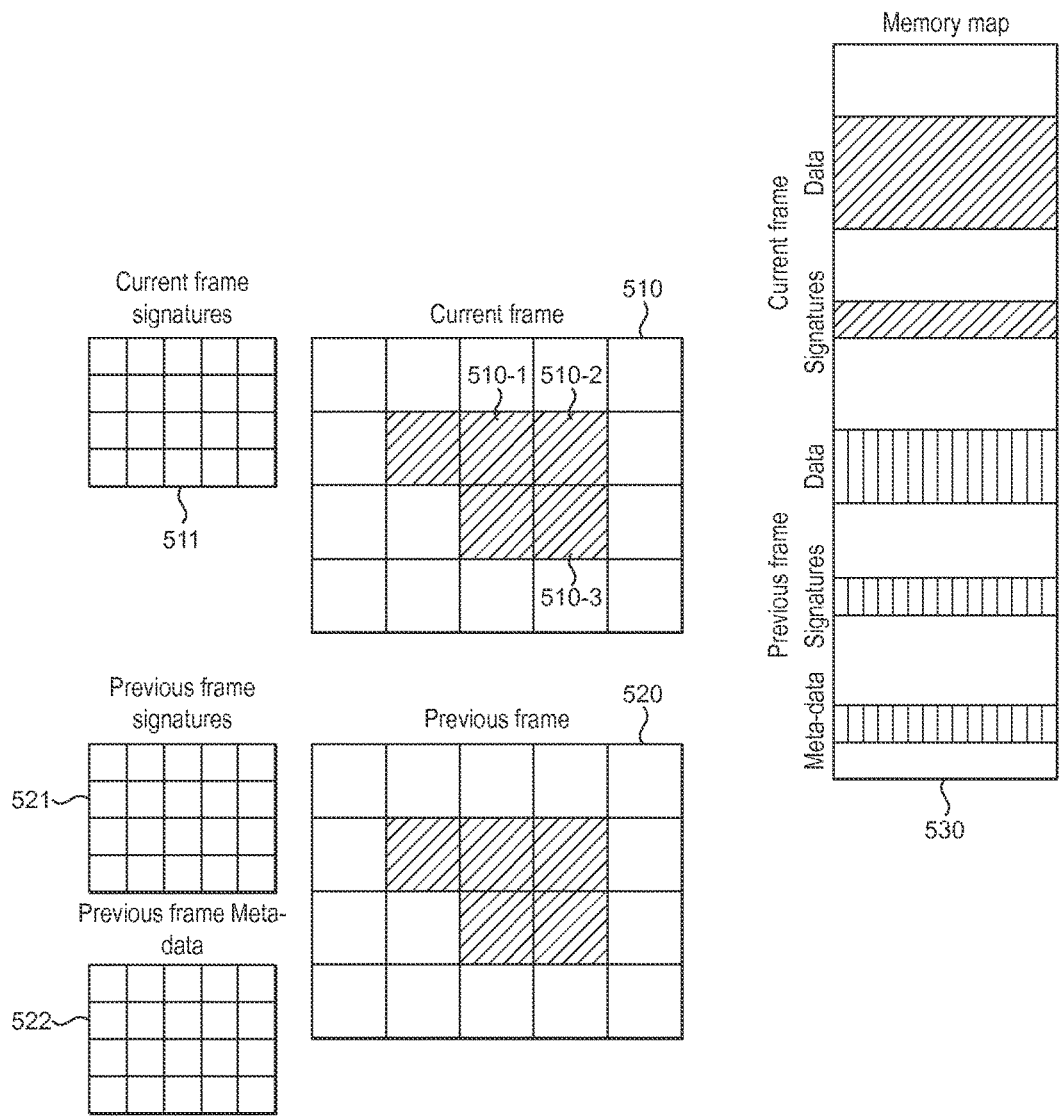
FIG. 5 shows a current frame, a preceding frame, their respective signatures, the frame meta-data of the preceding frame, and a memory map of the signatures, frame data and the meta-data.

FIG. 5 shows schematically the use of signatures to identify regions of a current input frame 510 that are the same as or similar to regions of a preceding (previous) input frame 520. For illustration purposes, it is assumed in FIG. 5 that a single content-indicating signature is provided for each relevant region of the frames in question, although as noted above, this need not be the case. FIG. 5 also shows an example of a memory map 530 that illustrates how the respective signatures, frame data and the meta-data may be stored.

As shown in FIG. 5, one or more signatures are generated for each region of the current frame 510 to obtain an array of signatures 511 representing the content of the current frame 510. Similarly, one or more signatures are generated for each region of the preceding frame 520 to obtain an array of signatures 521 representing the content of the preceding frame 520.

In the example of FIG. 5, the shading of the current frame 510 shows that these regions are determined to be similar to the corresponding regions of the preceding frame 520 based on a comparison between the signature array 511 and the signature array 521. The shading of the preceding frame 520 indicates that processing performed on these regions have made no change (or no discernible change), which can be read from the meta-data 522. It can therefore be seen that, based on the comparison between the signature arrays 511 and 521 and by using the meta-data 522 of the preceding frame 520, processing to be performed on regions 510-1, 510-2 and 510-3 of the current frame 510 can be bypassed, and the amount of processing can be reduced.

Figure 6:
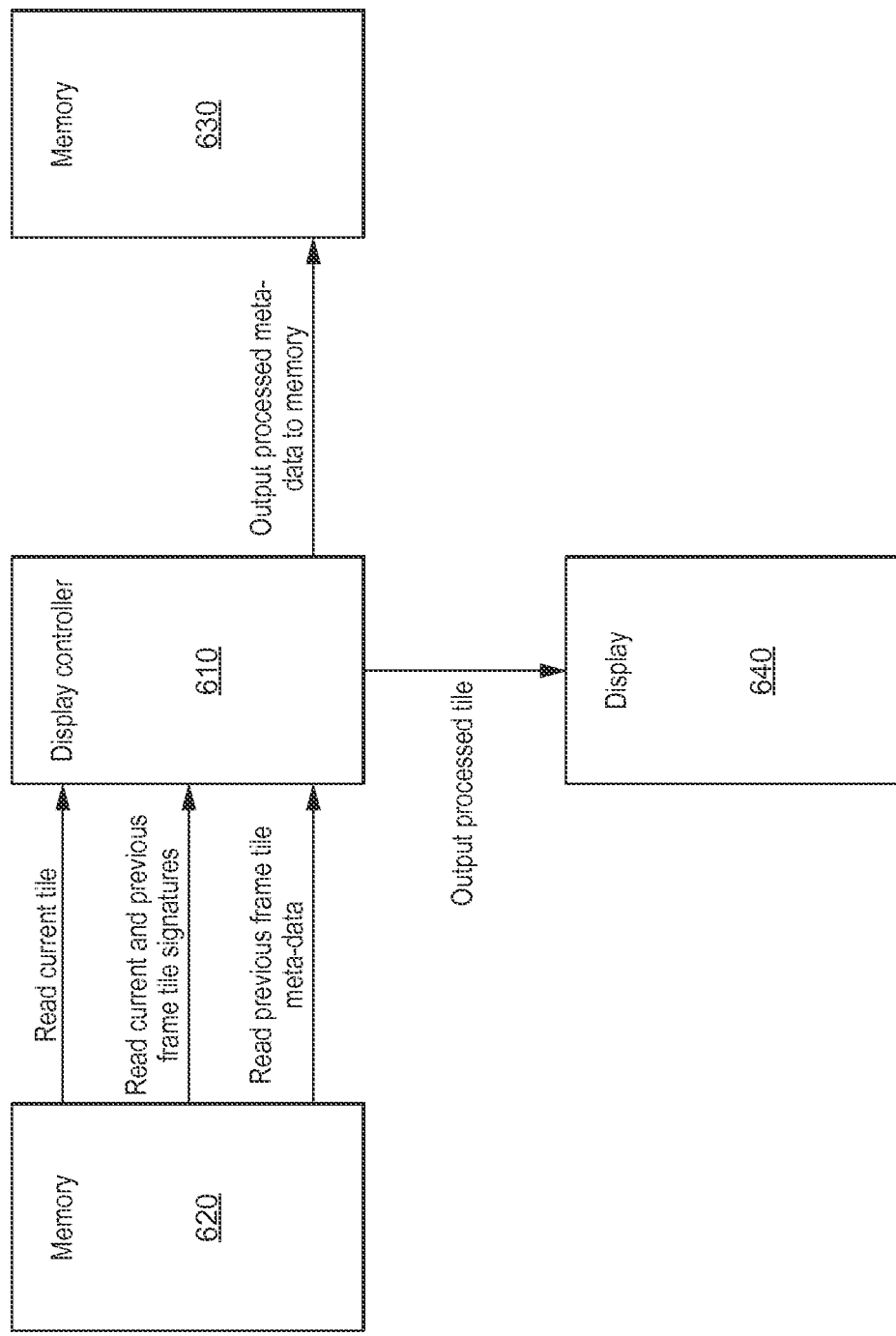
FIG. 6 is a data flow diagram for a display controller according to an embodiment.

As explained above, the comparison between two frame regions and the determination of whether they are the same or similar may be performed by the display controller of the system, the camera ISP, the image processor or the video engine as desired. An exemplary data flow diagram for a display controller performing the comparison and determination is shown FIG. 6. In the example of FIG. 6, it is assumed that a frame region corresponds to a processing tile. However, as explained above, this needs not be the case and in other examples, a frame region may comprises multiple processing tiles.

When a tile of the current input frame is to be processed, the display controller 610 reads the current input frame tile from memory 620 (e.g. from off-chip memory 130), and reads the signatures of the current input frame tile and a, e.g. corresponding, tile of a preceding input frame. The display controller 610 compares the signatures to determine whether the input frame tiles are similar. If it is determined that the current input frame tile is similar to the tile of the preceding input frame, the display controller 610 furthermore reads the meta-data corresponding to the tile of the preceding input frame from the memory 620, which comprises information relating to processing performed on the tile of the preceding input frame, and the current input frame tile is processed by the display controller 610 on the basis of the read meta-data. The display controller 610 then outputs the processed current input frame tile to display 640.

The display controller 610 may furthermore write the meta-data of the current input frame tile, which comprises information relating to processing performed on the tile of the current input frame, to memory 630. The meta-data of the current frame tile may be the same as the meta-data of the tile of the preceding input frame since the two tiles are similar, in which case the step of writing the meta-data of the current input frame tile may be bypassed. However, there may also be differences in some cases and it may be desirable to write the meta-data of the current input frame tile to memory. In the case where it is determined that the current input frame tile is not similar to the tile of the preceding input frame and the current input frame tile is processed, the meta-data of the current input frame tile may be written to memory.

The memory 620 and the memory 630 are shown in FIG. 6 as two separate blocks for illustration purpose only, they may be provided as separate memory units e.g. separate buffers, or they may be provided as a single memory unit and each block represents different memory locations.

Figure 7:
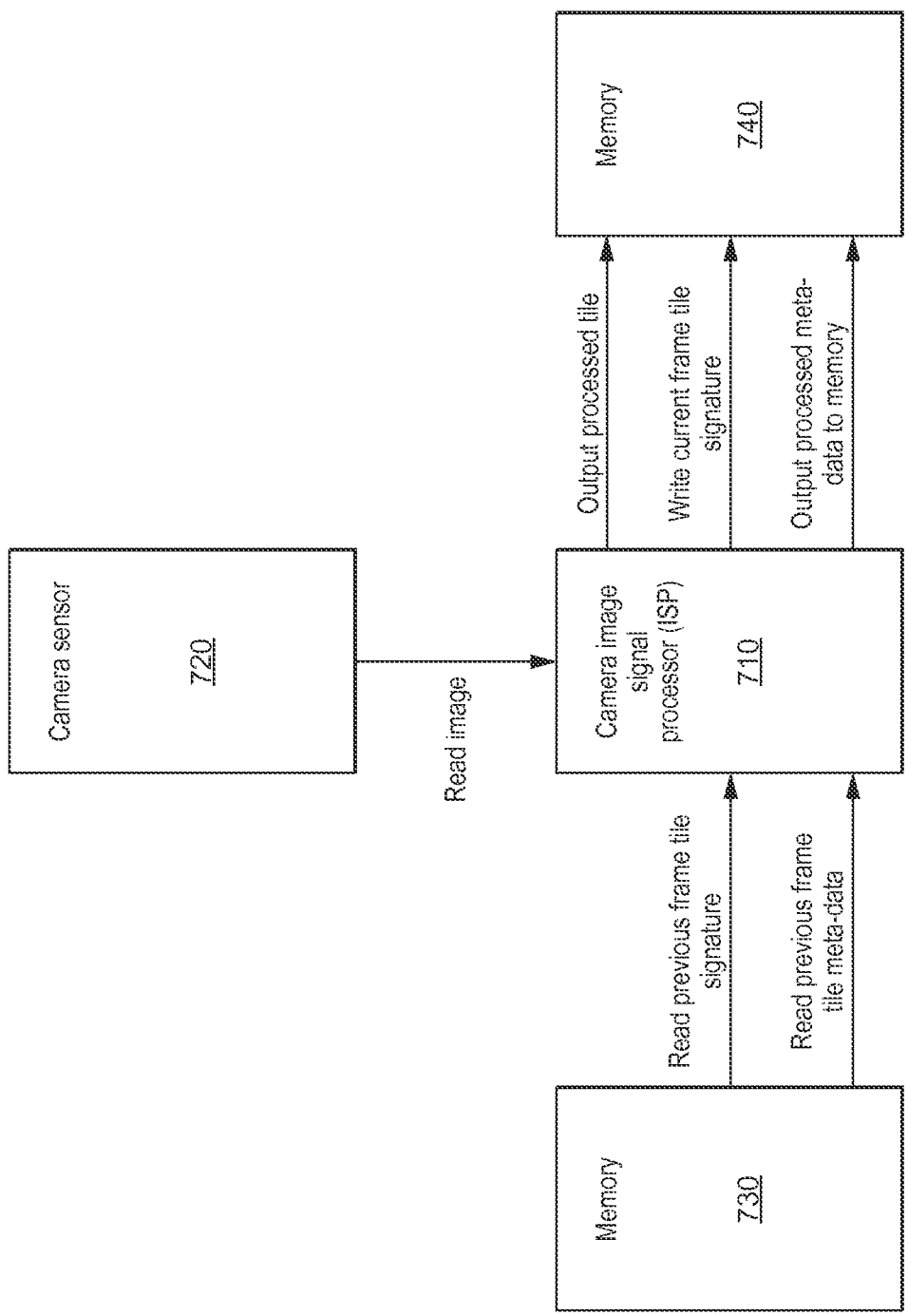
FIG. 7 is a data flow diagram for a camera ISP according to an embodiment.

An exemplary data flow diagram for a camera image signal processor (ISP) performing the comparison and determination is shown FIG. 7. In the example of FIG. 7, it is again assumed that a frame region corresponds to a processing tile.

The camera ISP 710 receives an image from camera sensor 720 to be processed. Unlike the example of FIG. 6, signatures have not been generated prior to the camera ISP receiving the image to be processed. Thus, in the present example, when the camera ISP 710 receives a current input frame (image) to be processed, it first generates a signature for each processing tile of the current input frame.

When a tile of the current input frame is to be processed, the camera ISP 710 reads the signature of a, e.g. corresponding, tile of a preceding input frame. The camera ISP 710 compares the signature of the current input frame tile and the signature of the tile of the preceding input frame to determine if they are similar. The camera ISP 710 furthermore reads the meta-data corresponding to the tile of the preceding input frame from memory 730, which comprises information relating to processing performed on the tile of the preceding input frame, and if it is determined that the current input frame tile is similar to the tile of the preceding input frame, the current input frame tile is processed by the camera ISP 710 on the basis of the read meta-data. The camera ISP 710 then outputs the processed current input frame tile, along with the signature and meta-data of the current input frame tile, which comprises information relating to processing performed on the tile of the current input frame, to memory 740. Again, the memory 730 and the memory 740 are shown as two separate blocks for illustration purpose only, and they may be provided as separate memory units e.g. separate buffers, or they may be provided as a single memory unit and each block represents different memory locations.

An exemplary data flow diagram for an image processor performing the comparison and determination is shown FIG.

Figure 8:
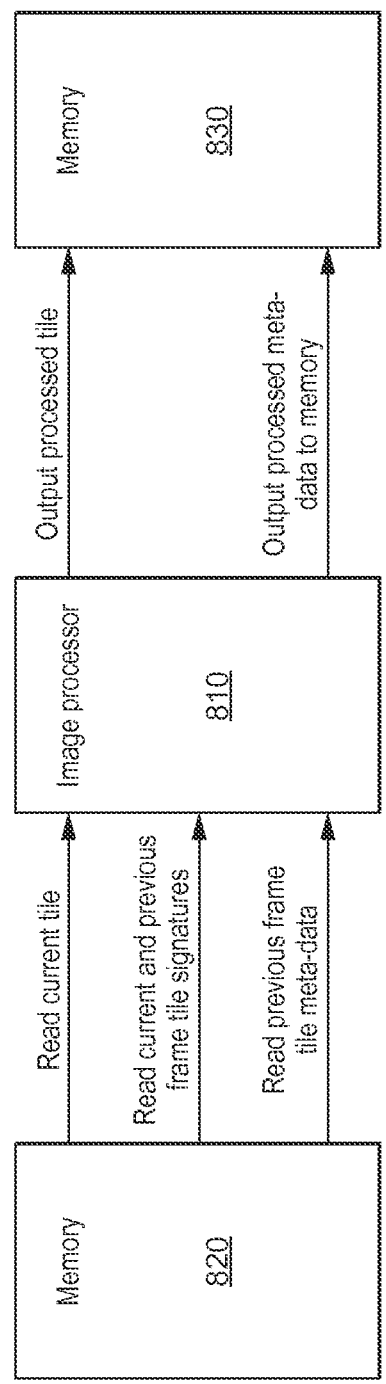
FIG. 8 is a data flow diagram for an image processor according to an embodiment.

8. As in the previous two examples, in the example of FIG. 8, it is assumed that a frame region corresponds to a processing tile.

When a tile of the current input frame is to be processed, the image processor 810 reads the current input frame tile from memory 820, and reads the signatures of the current input frame tile and a, e.g. corresponding, tile of a preceding input frame. The image processor 810 compares the signatures to determine whether the input frame tiles are similar. The image processor 810 furthermore reads the meta-data corresponding to the tile of the preceding input frame from the memory 820, which comprises information relating to processing performed on the tile of the preceding input frame, and if it is determined that the current input frame tile is similar to the tile of the preceding input frame, the current input frame tile is processed by the image processor 810 on the basis of the read meta-data. The image processor 810 then outputs the processed current input frame tile and the meta-data of the current input frame tile, which comprises information relating to processing performed on the tile of the current input frame, to memory 830. The memory 820 and the memory 830 are shown as two separate blocks for illustration purpose only, they may be provided as separate memory units e.g. separate buffers, or they may be provided as a single memory unit and each block represents different memory locations.

Figure 9:
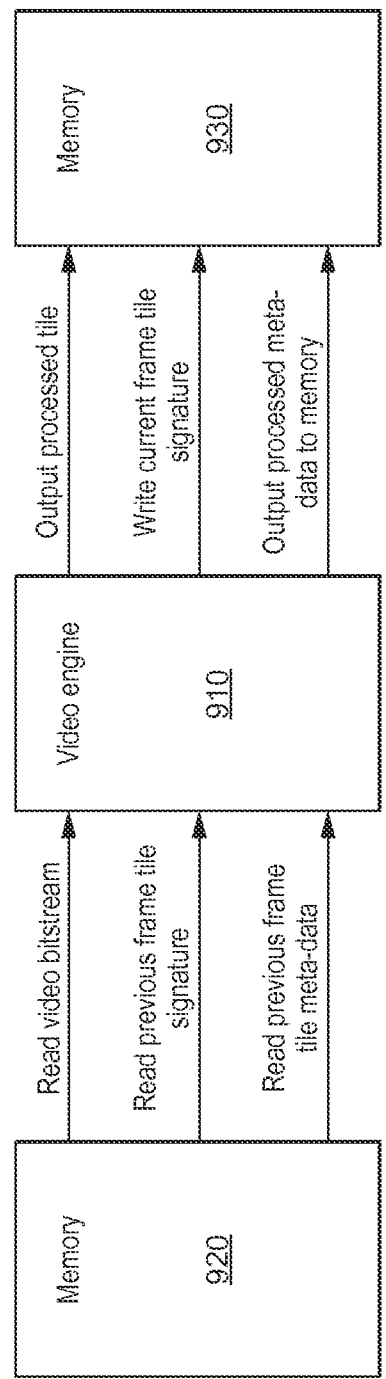
FIG. 9 is a data flow diagram for a video engine according to an embodiment.

An exemplary data flow diagram for a video engine performing the comparison and determination is shown FIG. 9. In the example of FIG. 9, it is again assumed that a frame region corresponds to a processing tile.

The video engine 910 reads a video bitstream to be processed from memory 920. In this example, signatures have not been generated prior to the video engine receiving the video bitstream to be processed. Thus, in the present example, when the video engine 910 receives a current input video frame to be processed, it first generates a signature for each processing tile of the current input frame.

When a tile of the current input frame is to be processed, the video engine 910 reads the signature of a, e.g. corresponding, tile of a preceding input frame. The video engine 910 compares the signature of the current input frame tile and the signature of the tile of the preceding input frame to determine if they are similar. The video engine 910 furthermore reads the meta-data corresponding to the tile of the preceding input frame from memory 920, which comprises information relating to processing performed on the tile of the preceding input frame, and if it is determined that the current input frame tile is similar to the tile of the preceding input frame, the current input frame tile is processed by the video engine 910 on the basis of the read meta-data. The video engine 910 then outputs the processed current input frame tile, along with the signature and meta-data of the current input frame tile, which comprises information relating to processing performed on the tile of the current input frame, to memory 930. Again, the memory 920 and the memory 930 are shown as two separate blocks for illustration purpose only, and they may be provided as separate memory units e.g. separate buffers, or they may be provided as a single memory unit and each block represents different memory locations.

Figure 10:
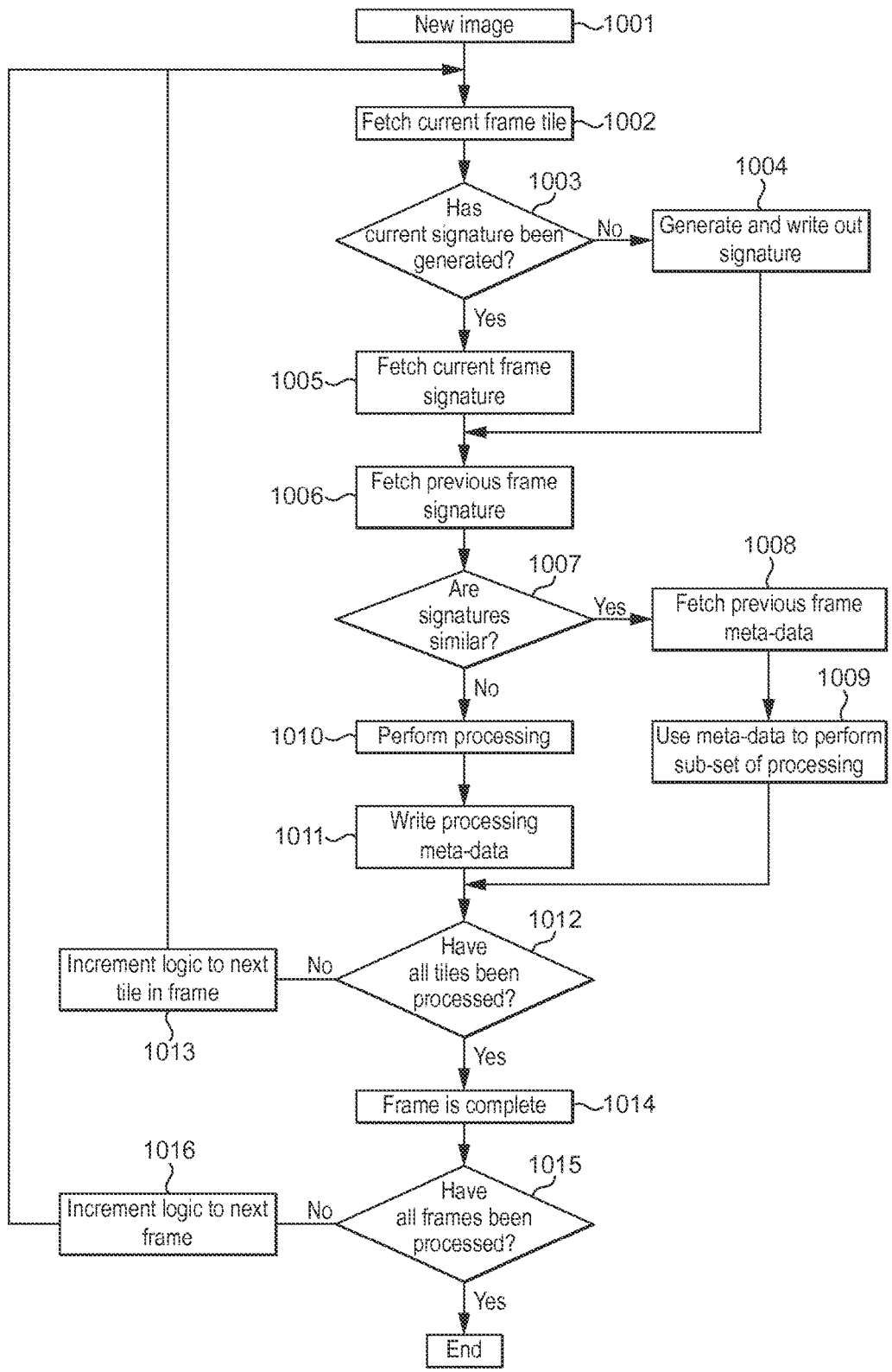
FIG. 10 is a flow diagram of a method for generating an output frame according to an embodiment.

An example of a method of generating an output frame according to an embodiment is illustrated as a flow diagram in FIG. 10.

At step 1001, a new image (current input frame) is received and processing starts. In the present example, it is assumed that a frame region corresponds to a processing tile.

At step 1002, a tile of the current input frame is fetched. As described above, in some embodiments, a signature has already been generated when the current input frame is received, but in other embodiments, a signature needs to be generated after the current input frame is received. Thus, at step 1003, it is determined whether a signature for the current input frame tile has been generated. If a signature for the current input frame tile has not been generated yet, at step 1004, a signature is generated for the current input frame tile and the signature is written to memory. If a signature for the current input frame tile has already been generated, the signature is fetched from memory.

Then, at step 1006, the signature for a, e.g. corresponding, tile of a preceding input frame is fetched from memory, and compared, at step 1007, with the signature for the current input frame tile.

If the current frame tile is determined to be similar to the tile of the preceding input frame, meta-data comprising information relating to processing performed on the tile of the preceding input frame, generated and stored when the tile of the preceding input frame was processed, is fetched from memory at step 1008, and processing of the current input frame tile is performed on the basis of the fetched meta-data at step 1009. The information may comprise an indicator indicating that processing performed on the tile of the preceding input frame has made no change (no discernible change or changes that only affects the LSB of the tile), in which case, based on the indication, part or all of the processing of the current input frame tile can be eliminated or bypassed.

If the current frame tile is determined to be not similar to the tile of the preceding input frame, processing of the current input frame tile is performed as normal at step 1010, and the meta-data comprising information relating to processing performed on the tile of the current input frame, generated during the processing of the current input frame tile, is written to memory at step 1011 for later use.

At step 1012, it is checked whether all tiles of the current input frame have been processed. If there are still tiles to be processed, at step 1013, the processing proceeds to the next tile in the current input frame and return to step 1002.

If all the tiles of the current input frame have been processed, processing of the current input frame is determined to be complete at step 1014, and it is checked at step 1015 whether all input frames have been processed. If there are more input frames to be processed, at step 1016, the processing proceeds to the next input frame and return to step 1002.

If there are no more input frames to be processed, the processing ends.

Figure 11:
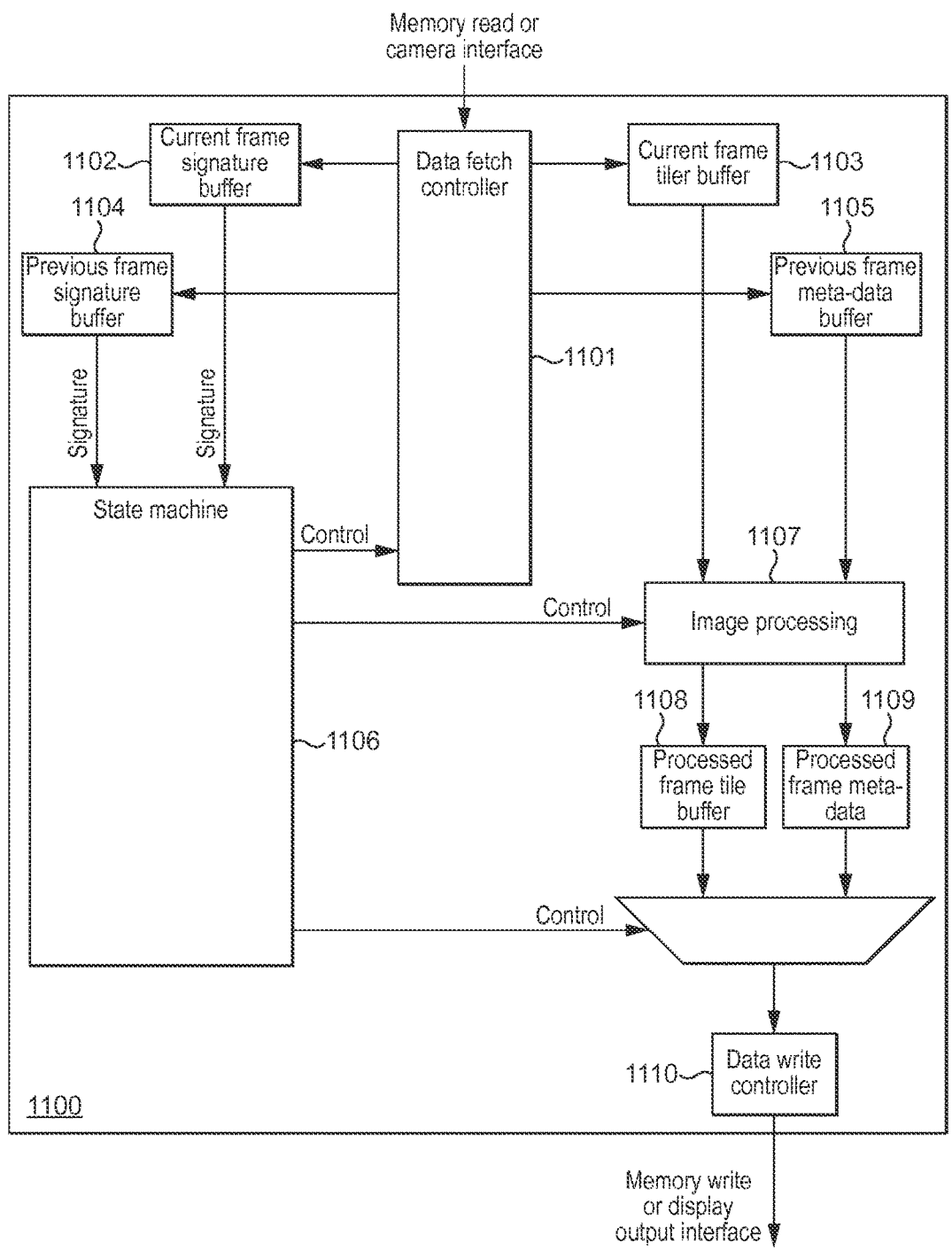
FIG. 11 is a schematic diagram showing functional blocks for implementing the method of FIG. 10.

As an implementation example of a method of generating an output frame according to an embodiment, a schematic diagram illustrating the functional blocks of an exemplary data processing system is shown in FIG. 11.

The data processing system 1100 comprises a data fetch controller 1101, which receives an input frame (e.g. an image captured by a camera sensor, a graphics frame, a video frame or a composite frame, etc.) and either fetches the signatures for the current input frame or, if signatures have not been generated for the current input frame, generates signatures for the current input frame. The data fetch controller 1101 then outputs the signatures for the current input frame to a current frame signature buffer 1102 and outputs the current input frame data to a current frame tiler buffer 1103. Furthermore, the data fetch controller 1101 fetches from memory (not shown) the signatures for a preceding input frame and meta-data generated when the preceding input frame was being processed, which comprises information relating to processing performed on the preceding input frame, and outputs the signatures and the meta-data to a previous frame signature buffer 1104 and a previous frame meta-data buffer 1105 respectively.

The current frame signature buffer 1102 and the previous frame signature buffer 1104 respectively output the signatures for the current input frame and the preceding input frame to a statemachine 1106. The statemachine 1106 compares a signature for a tile of the current input frame with the signature for a (e.g. corresponding) tile of the preceding input frame to determine if the two tiles are similar, and outputs control signals based on the result of the comparison and determination.

Upon receiving the control signals from the statemachine 1106, the data fetch controller 1101 causes the current frame tiler buffer 1103 to output the tile of the current input frame to image processing block 1107. Moreover, the data fetch controller 1101 causes the previous frame meta-data buffer 1105 to output meta-data of the tile of the preceding input frame, which comprises information relating to processing performed on the tile of the preceding input frame, to image processing block 1107. The tile of the current input frame is processed based on the control signals output from the statemachine 1106 according to embodiments of the method described above. For example, if the statemachine 1106 determines that the signature for the tile of the current input frame is similar to the signature for the tile of the preceding input frame, the statemachine 1106 may output a control signal to cause the image processing block 1107 to process the tile of the current input frame on the basis of the information relating to processing performed on the tile of the preceding input frame obtained by reading the meta-data received from the previous frame meta-data buffer 1105. As described above, the information may indicate that processing performed on the tile of the preceding input frame has made no change to the processed tile, in which case processing of the tile of the current input frame may be bypassed.

The corresponding tile of the current output frame (processed tile of the current input frame) and meta-data comprising information relating to processing performed on the tile of the current input frame, generated during the processing of the tile of the current input frame, are respectively output to a processed frame tile buffer 1108 and a processed frame meta-data buffer 1109, which are then output, based on the control signals from the statemachine 1106, to a data write controller 1110. The data write controller 1110 then writes the meta-data of the tile of the current input frame to memory and either writes the tile of the current output frame to memory or outputs it to a display.

As will be appreciated from the above, the technology described herein, in its embodiments at least, is capable of providing a mechanism for reducing the amount of processing required for a data (image) processing system to output a processed frame for display compared to known, conventional image processing techniques. It is therefore possible to reduce computational and power requirements for processing image or video content.

Although the technology has been described with reference to the embodiments, it will be understood by those skilled in the art that various changes in form and detail may be made without departing from the scope as set forth in the accompanying claims.

What is claimed is:

1. A method of generating output frames from input frames, in which input frames are processed when generating output frames, the method comprising:
when generating a region of a first output frame from a region of a first input frame:
processing the region of the first input frame;
generating information relating to the processing performed on the region of the first input frame; and
storing the information relating to the processing performed on the region of the first input frame; and
when generating a region of a second output frame from a region of a second input frame:
comparing the region of the second input frame with the region of the first input frame to determine if the region of the second input frame is similar to the region of the first input frame; and when the region of the second input frame is determined to be similar to the region of the first input frame:
reading the stored information relating to the processing performed on the region of the first input frame when generating the region of the first output frame;
determining whether the read information relating to the processing performed on the region of the first input frame when generating the region of the first output frame indicates that a part or all of the processing of the region of the second input frame is not required; and
when it is not determined that the read information relating to the processing performed on the region of the first input frame when generating the region of the first output frame indicates that a part or all of the processing of the region of the second input frame is not required:
processing the region of the second input frame; and
when it is determined that the read information relating to the processing performed on the region of the first input frame when generating the region of the first output frame indicates that a part or all of the processing of the region of the second input frame is not required:
omitting the part or all of the processing of the region of the second input frame.

2. The method of claim 1, further comprising:
comparing the region of the first input frame with the region of the first output frame to determine if the region of the first output frame is similar to the region of the first input frame, wherein the first output frame is obtained by performing the processing on the first input frame; and
storing the result of the comparison between the region of the first input frame and the region of the first output frame as part of the information relating to the processing performed on the region of the first input frame, by indicating that the processing is not required when the region of the first output frame is determined to be similar to the region of the first input frame, or indicating that the processing is necessary when the region of the first output frame is determined to be not similar to the region of the first input frame.

3. The method of claim 2, further comprising using the region of the second input frame as a corresponding region of a second output frame when the information indicates that the processing is not required.

4. The method of claim 2, further comprising processing the region of the second input frame to obtain a corresponding region of a second output frame when the information indicates that the processing is necessary.

5. The method of claim 1, further comprising assessing a likelihood of the region of the second input frame being similar to the region of the first input frame, and only performing the step of storing the information relating to the processing performed on the region of the first input frame when the region of the second input frame is assessed to be likely to be similar to the region of the first input frame.

6. The method of claim 1, further comprising:
performing analysis on the region of the first input frame; and
storing the result of the analysis as part of the information relating to the processing performed on the region of the first input frame.

7. The method of claim 6, wherein performing analysis comprises performing edge detection on the region of the first input frame and/or generating statistics on the region of the first input frame for use in one or more algorithms to be applied to process the region of the first input frame, and wherein the result of the analysis comprises the result of edge detection of whether one or more edges are detected, and/or an indication of one or more algorithms to be applied to process the region of the first input frame based on the result of edge detection, and/or the statistics on the region of the first input frame.

8. The method of claim 1, wherein the step of comparing comprises comparing one or more signatures representative of the content of the region in question with one or more signatures representative of the content of the frame region that the frame region in question is to be compared with.

9. The method of claim 1, wherein the processing performed on the first input frame comprises a plurality of processing stages that together generate a final first output frame for use, and the first output frame is an output frame generated during an intermediate processing stage of the plurality of processing stages, the first input frame is an input frame of the intermediate processing stage, and the second input frame is an input frame of the intermediate processing stage.

10. The method of claim 1, wherein the processing performed on the first input frame comprises a plurality of processing stages that together generate a final first output frame for use, and further comprising using the method for more than one of the plurality of processing stages.

11. An apparatus for generating output frames from input frames, comprising processing circuitry capable of processing input frames when generating output frames and control circuitry capable of:
when generating a region of a first output frame from a region of a first input frame:
processing the region of the first input frame;
generating information relating to the processing performed on the region of the first input frame; and
storing the information relating to the processing performed on the region of the first input frame; and
when generating a region of a second output frame from a region of a second input frame:
comparing the region of the second input frame with the region of the first input frame to determine if the region of the second input frame is similar to the region of the first input frame; and
when the region of the second input frame is determined to be similar to the region of the first input frame:
reading the stored information relating to the processing performed on the region of the first input frame when generating the region of the first output frame;
determining whether the read information relating to the processing performed on the region of the first input frame when generating the region of the first output frame indicates that a part or all of the processing of the region of the second input frame is not required; and
when it is not determined that the read information relating to the processing performed on the region of the first input frame when generating the region of the first output frame indicates that a part or all of the processing of the region of the second input frame is unnecessary not required:
processing the region of the second input frame; and
when it is determined that the read information relating to the processing performed on the region of the first input frame when generating the region of the first output frame indicates that a part or all of the processing of the region of the second input frame is not required:
omitting the part or all of the processing of the region of the second input frame.

12. The apparatus of claim 11, wherein the control circuitry is further capable of:
comparing the region of the first input frame with the region of the first output frame to determine if the region of the first output frame is similar to the region of the first input frame, wherein the first output frame is obtained by performing the processing on the first input frame; and
storing the result of the comparison between the region of the first input frame and the region of the first output frame as part of the information relating to the processing performed on the region of the first input frame, wherein the control circuitry is capable of storing the result of the comparison by indicating that the processing is not required when the region of the first output frame is determined to be similar to the region of the first input frame, or indicating that the processing is necessary when the region of the first output frame is determined to be not similar to the region of the first input frame.

13. The apparatus of claim 12, wherein the processing circuitry is capable of using the region of the second input frame as a corresponding region of a second output frame when the information indicates that the processing is not required.

14. The apparatus of claim 12, wherein the processing circuitry is capable of processing the region of the second input frame to obtain a corresponding region of a second output frame when the information indicates that the processing is necessary.

15. The apparatus of claim 11, wherein the control circuitry is further capable of assessing a likelihood of the region of the second input frame being similar to the region of the first input frame, and only stores the information relating to the processing performed on the region of the first input frame when the region of the second input frame is assessed to be likely to be similar to the region of the first input frame.

16. The apparatus of claim 11, wherein the control circuitry is further capable of:
performing analysis on the region of the first input frame; and
storing the result of the analysis as part of the information relating to the processing performed on the region of the first input frame.

17. The apparatus of claim 16, wherein the control circuitry is capable of performing analysis by performing edge detection on the region of the first input frame and/or generating statistics on the region of the first input frame for use in one or more algorithms to be applied to process the region of the first input frame, and wherein the result of the analysis comprises the result of edge detection of whether one or more edges are detected, and/or an indication of one or more algorithms to be applied to process the region of the first input frame based on the result of edge detection, and/or the statistics on the region of the first input frame.

18. The apparatus of claim 11, wherein the control circuitry is capable of performing the comparing by comparing one or more signatures representative of the content of the region in question with one or more signatures representative of the content of the frame region that the frame region in question is to be compared with.

19. The apparatus of claim 11, wherein the processing performed on the first input frame comprises a plurality of processing stages that together generate a final first output frame for use, and the first output frame is an output frame generated during an intermediate processing stage of the plurality of processing stages, the first input frame is an input frame of the intermediate processing stage, and the second input frame is an input frame of the intermediate processing stage.

20. The apparatus of claim 11, wherein the processing performed on the first input frame comprises a plurality of processing stages that together generate a final first output frame for use, and the apparatus is configured to perform the functions for more than one of the plurality of processing stages.

21. A non-transitory storage medium containing a computer program which, when run on a data processor, causes the data processor to perform a method of generating output frames from input frames, in which input frames are processed when generating output frames, the method comprising:

when generating a region of a first output frame from a region of a first input frame: processing the region of the first input frame;

generating information relating to the processing performed on the region of the first input frame; and storing the information relating to the processing performed on the region of the first input frame; and when generating a region of a second output frame from a region of a second input frame:

comparing the region of the second input frame with the region of the first input frame to determine if the region of the second input frame is similar to the region of the first input frame; and when the region of the second input frame is determined to be similar to the region of the first input frame:

reading the stored information relating to the processing performed on the region of the first input frame when generating the region of the first output frame;

determining whether the read information relating to the processing performed on the region of the first input frame when generating the region of the first output frame indicates that a part or all of the processing of the region of the second input frame is not required; and when it is not determined that the read information relating to the processing performed on the region of the first input frame when generating the region of the first output frame indicates that a part or all of the processing of the region of the second input frame is not required:

processing the region of the second input frame; and when it is determined that the read information relating to the processing performed on the region of the first input frame when generating the region of the first output frame indicates that a part or all of the processing of the region of the second input frame is not required: omitting the part or all of the processing of the region of the second input frame.

* * * * *